(12) United States Patent
Kiyokawa et al.

(10) Patent No.: US 10,300,982 B2
(45) Date of Patent: May 28, 2019

(54) DISC BRAKE ROTOR ADAPTER, DISC BRAKE ROTOR INCLUDING ADAPTER, MAGNETISM GENERATION DEVICE

(71) Applicant: Shimano Inc., Sakai, Osaka (JP)

(72) Inventors: Kanako Kiyokawa, Osaka (JP); Satoshi Shahana, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/866,621

(22) Filed: Jan. 10, 2018

(65) Prior Publication Data

US 2018/0201340 A1 Jul. 19, 2018

(30) Foreign Application Priority Data

Jan. 13, 2017 (JP) .................. 2017-004720
Feb. 9, 2017 (JP) .................. 2017-022141

(51) Int. Cl.
*B62L 1/00* (2006.01)
*G01P 3/44* (2006.01)
*G01P 3/487* (2006.01)
*B62J 99/00* (2009.01)
*B62K 25/02* (2006.01)

(52) U.S. Cl.
CPC ............. *B62L 1/005* (2013.01); *G01P 3/44* (2013.01); *G01P 3/487* (2013.01); *B62J 2099/002* (2013.01); *B62K 25/02* (2013.01); *B62K 2207/00* (2013.01)

(58) Field of Classification Search
CPC . B62L 1/005; B62J 2099/002; F16D 2300/18; G01P 3/44; G01P 3/487; B62K 2207/00
See application file for complete search history.

(56) References Cited

U.S. PATENT DOCUMENTS

| | | | |
|---|---|---|---|
| 3,522,973 A | 8/1970 | Klein et al. | |
| 6,371,252 B1 | 4/2002 | Kanehisa | |
| 8,008,817 B2 | 8/2011 | Lamperth | |
| 2005/0139432 A1* | 6/2005 | Takizawa | F16D 65/123 188/26 |

(Continued)

FOREIGN PATENT DOCUMENTS

| | | |
|---|---|---|
| JP | 10-076988 A | 3/1998 |
| WO | 2012-017096 A1 | 2/2012 |

*Primary Examiner* — Vishal R Sahni
(74) *Attorney, Agent, or Firm* — Global IP Counselors, LLP

(57) ABSTRACT

A disc brake rotor adapter is configured to detect a rotational state of a bicycle wheel. The disc brake rotor includes an adapter and a magnetism generation device. The disc brake rotor adapter is configured to attach a disc brake rotor main body to a hub of a bicycle. The adapter includes an adapter main body, a magnetism generation portion and an attaching portion. The adapter main body includes an inner portion and an outer portion. The inner portion includes a second spline configured to be engaged with a first spline provided on the hub. The disc brake rotor main body is coupled to the outer portion. The attaching portion attaches the magnetism generation portion to the adapter main body in a manner irrelevant to a fixing function of a fixing member. The fixing member is configured to fix the adapter to the hub.

31 Claims, 17 Drawing Sheets

(56) References Cited

U.S. PATENT DOCUMENTS

| | | | |
|---|---|---|---|
| 2005/0230199 A1* | 10/2005 | Takizawa | B62L 1/005 188/218 XL |
| 2005/0275561 A1* | 12/2005 | Kolda | B60B 27/0068 340/870.07 |
| 2007/0240945 A1* | 10/2007 | Hirotomi | B60B 27/0052 188/26 |
| 2010/0250082 A1 | 9/2010 | King et al. | |
| 2013/0162011 A1* | 6/2013 | Ruopp | B60T 11/16 303/9.64 |
| 2014/0171258 A1* | 6/2014 | Boudet | G01L 3/1478 477/3 |
| 2017/0151829 A1* | 6/2017 | Neutsch | B60B 1/003 |
| 2018/0201339 A1* | 7/2018 | Shahana | B62L 1/005 |

* cited by examiner

DISC BRAKE ROTOR ADAPTER, DISC BRAKE ROTOR INCLUDING ADAPTER, MAGNETISM GENERATION DEVICE

CROSS-REFERENCE TO RELATED APPLICATIONS

This application claims priority to Japanese Patent Application No. 2017-04720, filed on Jan. 13, 2017 and Japanese Patent Application No. 2017-022141, filed on Feb. 9, 2017. The entire disclosures of Japanese Patent Application Nos. 2017-04720 and 2017-022141 are hereby incorporated herein by reference.

BACKGROUND

Field of the Invention

The present invention relates to a disc brake rotor adapter, a disc brake rotor including an adapter, and a magnetism generation device.

Background Information

A technique for detecting a rotational state of a wheel is known. For example, Japanese Laid-Open Patent Publication No. 10-076988 (patent document 1) discloses a technique to detect a wheel rotational state. In particular, the patent document 1 discloses a sensor that detects a magnet attached to a spoke of a wheel to detect the rotational state of the wheel.

SUMMARY

One object of the present invention is to provide a disc brake rotor adapter that is preferably used to detect a rotational state of a bicycle wheel, a disc brake rotor including the adapter, and a magnetism generation device.

In accordance with a first aspect of the present invention, a disc brake rotor adapter is configured to attach a disc brake rotor main body to a bicycle hub having a first spline. The adapter includes an adapter main body, a magnetism generation portion, and an attaching portion. The adapter main body includes an inner portion and an outer portion. The inner portion has a second spline configured to be engaged with the first spline provided on the hub. The outer portion is configured to be coupled to the disc brake rotor main body. The attaching portion attaches the magnetism generation portion to the adapter main body in a manner irrelevant to a fixing function of a fixing member. The fixing member is configured to fix the adapter to the hub. With the disc brake rotor adapter according to the first aspect, the magnetism generation portion is attached to the disc brake rotor adapter to detect the rotational state of a wheel of the bicycle.

In accordance with a second aspect of the present invention, the disc brake rotor adapter according to the first aspect is configured so that the attaching portion is configured to be attachable to and removable from the adapter main body. With the disc brake rotor adapter according to the second aspect, the magnetism generation portion can be attached to the disc brake rotor adapter in accordance with the demand of the user. Thus, the usability is improved.

In accordance with a third aspect of the present invention, the disc brake rotor adapter according to the first or second aspect is configured so that the attaching portion includes a holder holding the magnetism generation portion and an engagement portion engaging the adapter main body. With the disc brake rotor adapter according to the third aspect, the magnetism generation portion is held by the holder. Thus, the magnetism generation portion is stably attached to the disc brake rotor adapter.

In accordance with a fourth aspect of the present invention, the disc brake rotor adapter according to the third aspect is configured so that the engagement portion includes a first threaded part. With the disc brake rotor adapter according to the fourth aspect, the first threaded part allows the magnetism generation portion to be easily attached to the disc brake rotor adapter.

In accordance with a fifth aspect of the present invention, the disc brake rotor adapter according to the fourth aspect is configured so that the adapter main body includes a second threaded part that engages the first threaded part. With the disc brake rotor adapter according to the fifth aspect, the engagement of the first threaded part with the second threaded part easily attaches the magnetism generation portion to the disc brake rotor adapter.

In accordance with a sixth aspect of the present invention, the disc brake rotor adapter according to the fourth aspect is configured so that the engagement portion is formed separately from the holder. The holder includes a first through hole through which the engagement portion extends, and a third threaded part engaged with the first threaded part in a state where the engagement portion extends through the first through hole. With the disc brake rotor adapter according to the sixth aspect, the engagement of the first threaded part with the third threaded part easily attaches the magnetism generation portion to the disc brake rotor adapter.

In accordance with a seventh aspect of the present invention, the disc brake rotor adapter according to the fourth aspect is configured so that the engagement portion is formed separately from the holder. The adapter main body includes a second through hole through which the engagement portion extends. The holder includes a fourth threaded part engaged with the first threaded part in a state where the engagement portion extends through the second through hole. With the disc brake rotor adapter according to the seventh aspect, the engagement of the first threaded part with the fourth threaded part easily attaches the magnetism generation portion to the disc brake rotor adapter.

In accordance with an eighth aspect of the present invention, the disc brake rotor adapter according to the first aspect is configured so that the attaching portion is formed integrally with the adapter main body. With the disc brake rotor adapter according to the eighth aspect, the magnetism generation portion is stably attachable to the adapter main body.

In accordance with a ninth aspect of the present invention, the disc brake rotor adapter according to any one of the first to seventh aspects is configured so that the outer portion includes a plurality of projections projecting radially outward. The disc brake rotor main body is coupled to the plurality of projections. With the disc brake rotor adapter according to the ninth aspect, the magnetism generation portion is attachable to one of the projections.

In accordance with a tenth aspect of the present invention, the disc brake rotor adapter according to the ninth aspect is configured so that the magnetism generation portion is provided between two adjacent ones of the projections. With the disc brake rotor adapter according to the tenth aspect, the magnetism generation portion is provided between two adjacent ones of the projections. This limits enlargement of the device.

In accordance with an eleventh aspect of the present invention, the disc brake rotor adapter according to the ninth aspect is configured so that the magnetism generation portion is provided on one of the projections. With the disc brake rotor adapter according to the eleventh aspect, the magnetism generation portion can be provided on one of the projections.

In accordance with a twelfth aspect of the present invention, the disc brake rotor adapter according to the first aspect is configured so that the outer portion includes a plurality of projections projecting radially outward. The disc brake rotor main body is coupled to the plurality of projections. Each of the projections includes a first hole used for attachment of the disc brake rotor main body. The attaching portion is inserted into one of the first holes and fixed to the corresponding projection. With the disc brake rotor adapter according to the twelfth aspect, the insertion of the attaching portion into the first hole stably fixes the magnetism generation portion to the projection. Additionally, the first hole, which is used for attachment of the disc brake rotor main body, is used to attach the magnetism generation portion to the disc brake rotor adapter. This limits enlargement of the device.

In accordance with a thirteenth aspect of the present invention, the disc brake rotor adapter according to the twelfth aspect is configured so that the disc brake rotor main body includes a second hole. The attaching portion includes a joining portion that is inserted into one of the first holes and the second hole to join the corresponding projection and the disc brake rotor main body. With the disc brake rotor adapter according to the thirteenth aspect, the insertion of the attaching portion into the first hole and the second hole stably fixes the magnetism generation portion to the projection. Additionally, the first hole, which is used for attachment of the disc brake rotor main body, and the second hole are used to attach the magnetism generation portion to the disc brake rotor adapter. This limits enlargement of the device.

In accordance with a fourteenth aspect of the present invention, the disc brake rotor adapter according to any one of the first to thirteenth aspects is configured so that the magnetism generation portion includes at least one permanent magnet. With the disc brake rotor adapter according to the fourteenth aspect, the magnetism generation portion stably generates magnetism.

In accordance with a fifteenth aspect of the present invention, the disc brake rotor adapter according to any one of the first to ninth aspects is configured so that the magnetism generation portion includes an annular permanent magnet. The annular permanent magnet includes a plurality of magnetic poles located next to one another in a circumferential direction. With the disc brake rotor adapter according to the fifteenth aspect, detection of the plurality of magnetic poles increases the accuracy for detecting the rotational state of the bicycle wheel.

In accordance with a sixteenth aspect of the present invention, the disc brake rotor adapter according to any one of the first to ninth and eleventh to thirteenth aspects is configured so that the attaching portion includes an annular base. The magnetism generation portion includes a plurality of permanent magnets spaced apart from one another in a circumferential direction of the base. With the disc brake rotor adapter according to the sixteenth aspect, the magnetism of the plurality of permanent magnets is detected. This increases the accuracy for detecting the rotational state of the bicycle wheel.

In accordance with a seventeenth aspect of the present invention, the disc brake rotor adapter according to any one of the first to sixteenth aspects further includes a thermal insulation portion located between the magnetism generation portion and the attaching portion. The thermal insulation portion limits heat transfer between the magnetism generation portion and the attaching portion. With the disc brake rotor adapter according to the seventeenth aspect, the thermal insulation portion reduces the effect of heat on the magnetism generated from the magnetism generation portion.

In accordance with an eighteenth aspect of the present invention, the disc brake rotor adapter according to any one of the first to seventeenth aspects is configured so that the adapter main body includes one of steel and an aluminum alloy. With the disc brake rotor adapter according to the eighteenth aspect, the adapter main body is formed from an appropriate material.

In accordance with a nineteenth aspect of the present invention, a disc brake rotor includes the disc brake rotor adapter according to any one of the first to eighteenth aspects and the disc brake rotor main body coupled to the adapter. With the disc brake rotor according to the nineteenth aspect, the disc brake rotor is preferably used to detect the rotational state of the bicycle wheel.

In accordance with a twentieth aspect of the present invention, a disc brake rotor includes a plurality of first coupling portions attachable to a hub of a bicycle with bolts, a second coupling portion provided at a position that differs from positions of the first coupling portions, a magnetism generation portion, and an attaching portion that couples the magnetism generation portion to the second coupling portion so that the magnetism generation portion is attachable to and removable from the second coupling portion. With the disc brake rotor according to the twentieth aspect, the disc brake rotor attachable to the bicycle hub with bolts is preferably used to detect the rotational state of the bicycle wheel.

In accordance with a twenty-first aspect of the present invention, a magnetism generation device is attachable to a disc brake rotor that includes a hub connector configured to be coupled to a bicycle hub, a main body located at a radially outer side of the hub connector, and a plurality of arms extending radially and connecting the hub connector and the main body. The magnetism generation device includes a magnetism generation portion, a holder holding the magnetism generation portion, and a third coupling portion formed integrally with the holder. The third coupling portion is attachable to a first side surface of the disc brake rotor in an axial direction. The holder is configured so that in a state where the third coupling portion is attached to the first side surface, the magnetism generation portion at least partially projects from the first side surface into a cavity defined between adjacent ones of the arms in a circumferential direction of the disc brake rotor. With the magnetism generation device according to the twenty-first aspect, the disc brake rotor is preferably used to detect the rotational state of the bicycle wheel.

In accordance with a twenty-second aspect of the present invention, the magnetism generation device according to the twenty-first aspect is configured so that the magnetism generation portion is embedded in the holder. With the magnetism generation device according to the twenty-second aspect, the magnetism generation device is stably attachable to the disc brake rotor.

In accordance with a twenty-third aspect of the present invention, a magnetism generation device is attached to an adapter main body including an inner portion, which includes a second spline configured to be engaged with a first spline provided on a bicycle hub, and an outer portion configured to be coupled to a disc brake rotor main body.

The outer portion includes a projection projecting radially outward. The magnetism generation device includes a magnetism generation portion and an attaching portion attaching the magnetism generation portion to the adapter main body in a manner irrelevant to a fixing function of a fixing member. The fixing member is configured to fix the adapter main body to the hub. The attaching portion includes a holder holding the magnetism generation portion, and a plurality of engagement portions. The holder includes a first portion and a second portion that is located at opposite sides of the projection. The plurality of engagement portions is coupled to the first portion and the second portion.

In accordance with a twenty-fourth aspect of the present invention, the magnetism generation device according to the twenty-third aspect is configured so that each of the plurality of engagement portions is formed by a bolt.

In accordance with a twenty-fifth aspect of the present invention, the magnetism generation device according to the twenty-third or twenty-fourth aspect is configured so that at least two of the plurality of engagement portions are located at opposite sides of the projection in a circumferential direction.

In accordance with a twenty-sixth aspect of the present invention, the magnetism generation device according to any one of the twenty-third to twenty-fifth aspects is configured so that each of the plurality of engagement portions includes a first threaded part, the first portion includes a first through hole through which the engagement portion extends, and the second portion includes a third threaded part, which engages the first threaded part.

In accordance with a twenty-seventh aspect of the present invention, the magnetism generation device according to any one of the twenty-third to twenty-sixth aspects is configured so that the magnetism generation portion is located on the first portion.

In accordance with a twenty-eighth aspect of the present invention, the magnetism generation device according to the twenty-seventh aspect is configured so that the first portion includes a recess, and the magnetism generation portion is accommodated in the recess.

In accordance with a twenty-ninth aspect of the present invention, the magnetism generation device according to the twenty-eighth aspect is configured so that the entire magnetism generation portion is accommodated in the recess.

In accordance with a thirtieth aspect of the present invention, the magnetism generation device according to any one of the twenty-third to twenty-ninth aspects is configured so that the first portion is formed from one of an aluminum alloy and a resin.

In accordance with a thirty-first aspect of the present invention, a disc brake rotor adapter includes the magnetism generation device according to any one of the twenty-third to thirtieth aspects and the adapter main body.

Accordingly, the disc brake rotor adapter, the disc brake rotor including the adapter, and the magnetism generation device are preferably used to detect a rotational state of a bicycle wheel.

BRIEF DESCRIPTION OF THE DRAWINGS

Referring now to the attached drawings, which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A disc brake rotor 10 that includes a first embodiment of an adapter 20A will now be described with reference to FIGS. 1 to 13.

Figure 1:
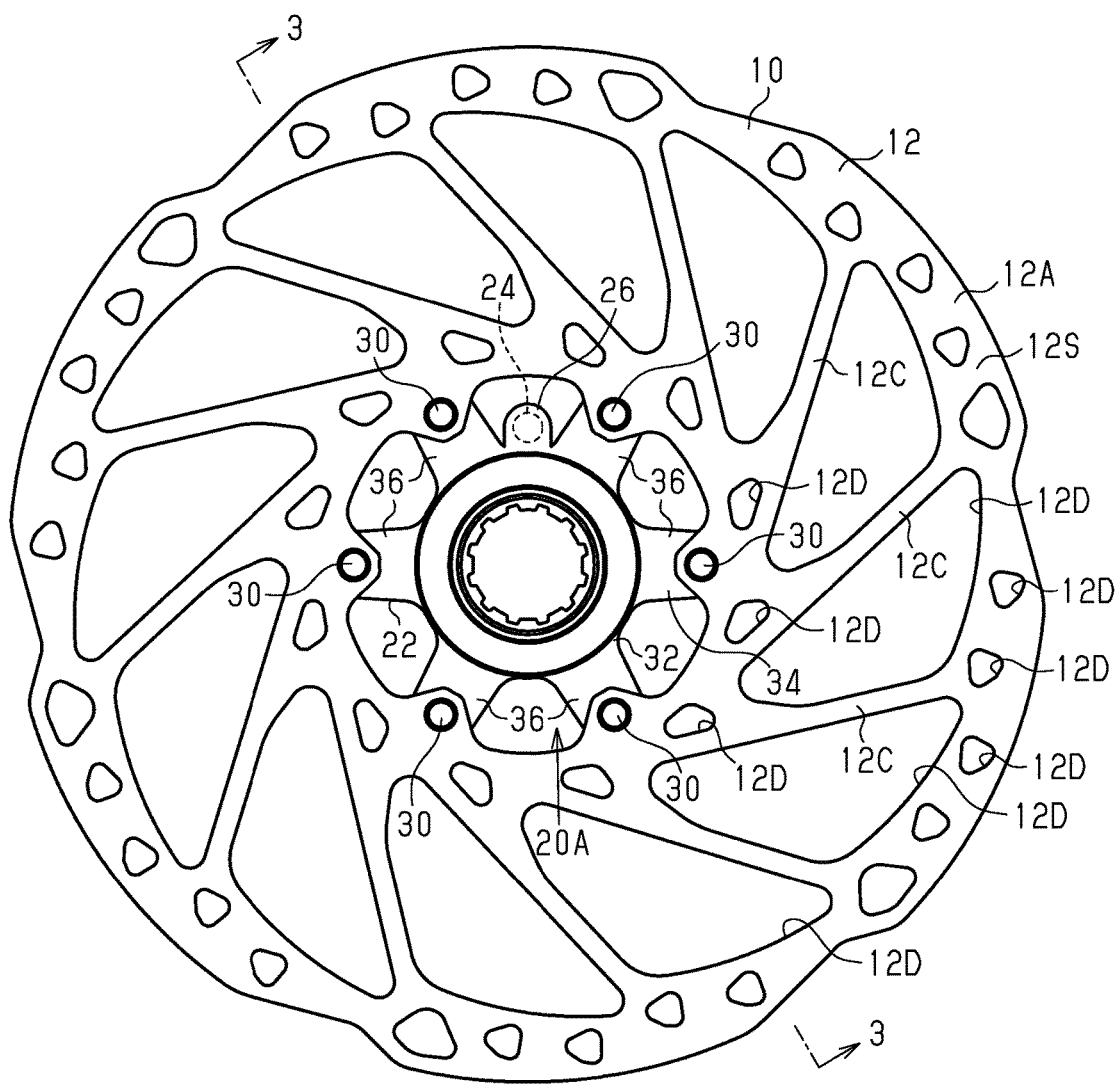
FIG. 1 is a side elevational view of a bicycle hub having a disc brake rotor, which includes a disc brake adapter, and a bicycle magnetism generation device in accordance with a first embodiment as views in a first direction.

As shown in FIG. 1, the disc brake rotor 10 includes the adapter 20A and a main body 12 that is coupled to the adapter 20A.

Figure 2:
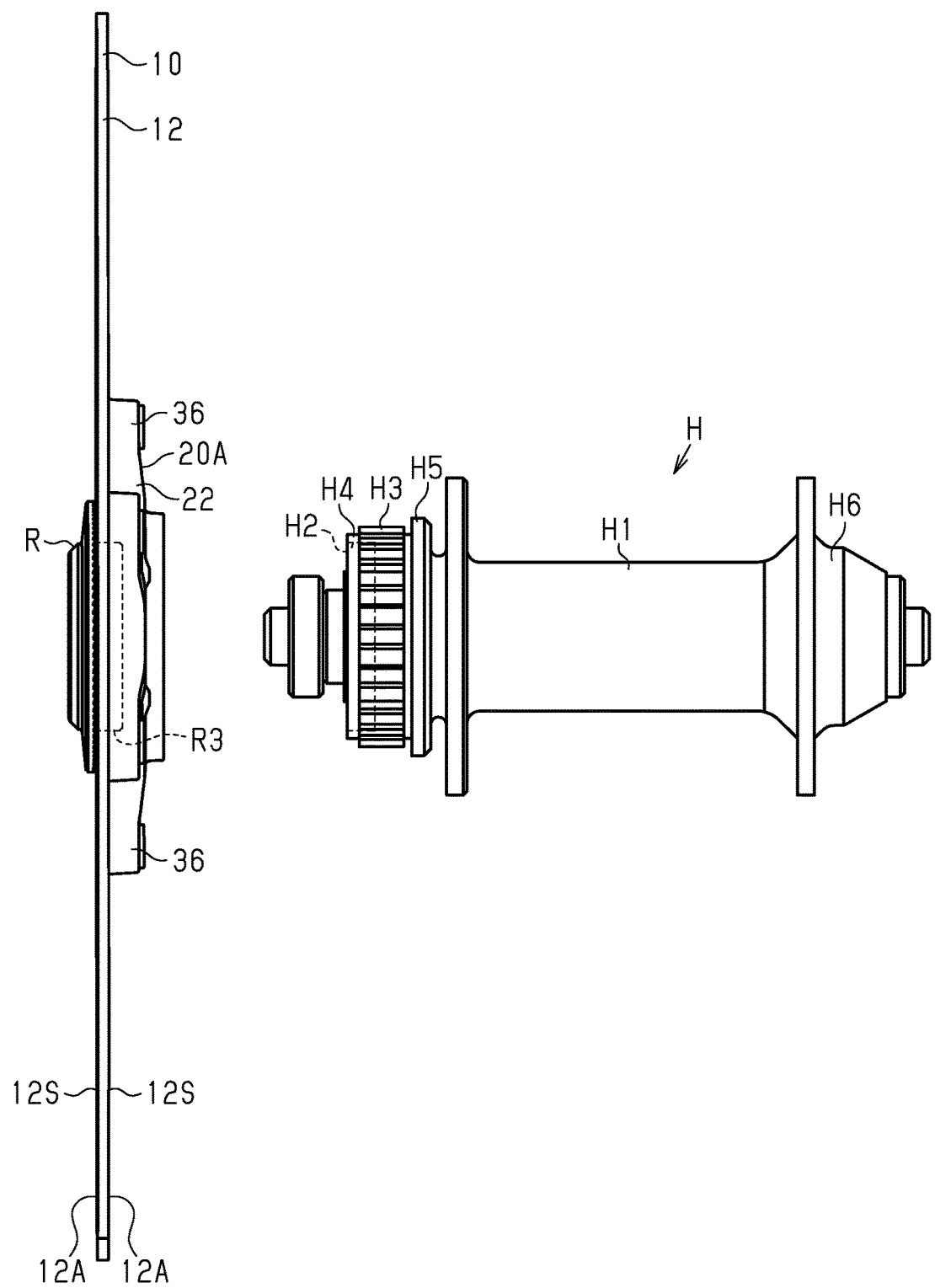
FIG. 2 is an exploded front elevational view of the bicycle hub and the disc brake rotor having the disc brake adapter shown in FIG. 1.

As shown in FIG. 2, the disc brake rotor 10 is fixed to a bicycle hub H by a fixing member R, which fixes the adapter 20A to the bicycle hub H (simply referred to as hub H). The hub H includes a hub shell H1, which rotates integrally with the disc brake rotor 10. The fixing member R has a fixing function that fixes the adapter 20A to the hub H. More specifically, the hub H has an outer circumference with a plurality of first splines H3 that mate with a plurality of second splines 32A of the disc brake rotor 10. With the second splines 32A engaged with the first splines H3, the disc brake rotor 10 is held between the hub H and the fixing member R. In this way, the disc brake rotor 10 is non-rotatably coupled to the hub H. The hub shell H1 of the hub H has a first end H4 in a direction that extends along a rotational axis of the hub H. The first splines H3 are provided on the first end H4. The first splines H3 include ridges and valleys that extend in the direction extending along the rotational axis of the hub H. A projection H5 is formed on an outer circumference of the hub shell H1 adjacent to the first splines H3. The projection H5 is located closer to a second end H6 of the hub shell H1 than the first splines H3 in the direction extending along the rotational axis of the hub H. The projection H5 projects to an outer side of the first splines H3 in a radial direction of the hub H. It is preferred that the projection H5 be formed on the entire circumference of the hub shell H1. In FIG. 2, the hub H does not include a freewheel. However, the hub H can include a freewheel.

Figure 3:
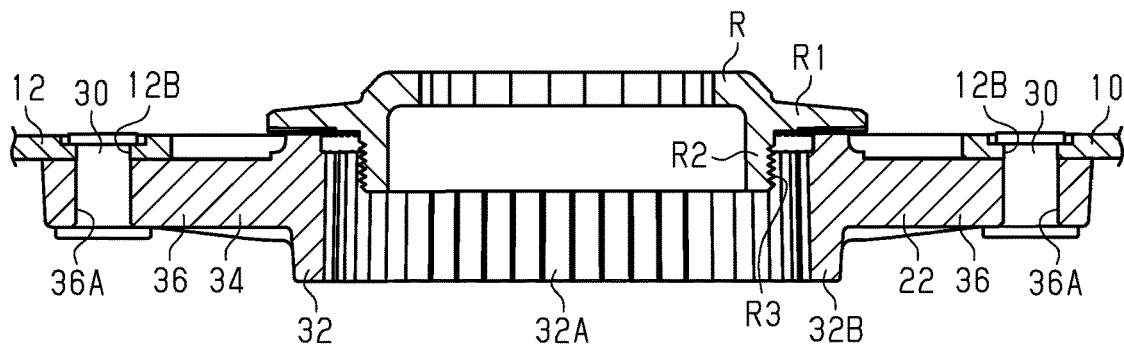
FIG. 3 is a partially cross-sectional view of the disc brake rotor and the disc brake adapter taken along section line 3-3 in FIG. 1.

The fixing member R includes a disc-shaped discoid portion R1 and a projection R2, which projects from the discoid portion R1 in an axial direction of the disc brake rotor 10. In the description hereafter, the axial direction of the disc brake rotor 10 is simply referred to as "the axial direction." The projection R2 has an outer circumference including an externally-threaded part R3. As shown in FIG. 3, the externally-threaded part R3 of the projection R2 is configured to be fastened to an internally-threaded part H2, which is formed on an inner circumference of the hub shell H1 of the hub H. In a case where the outer circumference of the hub shell H1 of the hub H includes an externally-threaded part that fastens the fixing member R, the projection R2 can be omitted from the fixing member R. In this case, an inner circumference of the discoid portion R1 includes an internally-threaded part configured to be fastened to the external threaded part, which is formed on the outer circumference of the hub shell H1.

As shown in FIG. 1, the main body 12 is discoid. The main body 12 includes a pair oppositely facing slide surfaces 12A, which are slidable on brake pads (not shown) of a disc brake caliper. As shown in FIG. 2, the slide surfaces 12A are defined by opposite side surfaces 12S of the main body 12 in the axial direction. The main body 12 is annular. The slide surfaces 12A are formed on outer circumferences of the main body 12. As shown in FIG. 3, second holes 12B extend through the main body 12 in the vicinity of an inner circumference of the main body 12 in a direction parallel to the axial direction. It is preferred that through holes 12D extend through each of the outer circumference and the inner circumference of the main body 12 and an intermediate portion of the main body 12, which is located between the outer circumference and the inner circumference, in the direction parallel to the axial direction. It is preferred that the intermediate portion include a plurality of arms 12C. The arms 12C are spaced apart from one another in a circumferential direction and outwardly extend in a radial direction of the disc brake rotor 10. In the description hereafter, the radial direction of the disc brake rotor 10 is simply referred to as "the radial direction."

Figure 4:
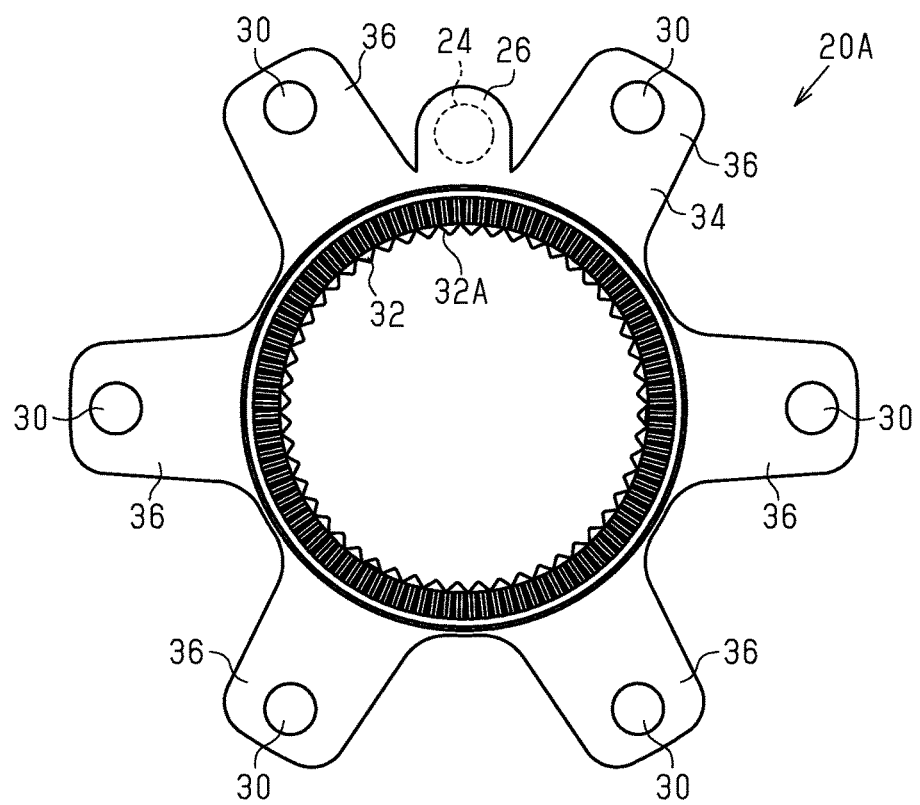
FIG. 4 is a side elevational view of the disc brake adapter with the bicycle magnetism generation device as viewed in the first direction in FIG. 1.
Figure 5:
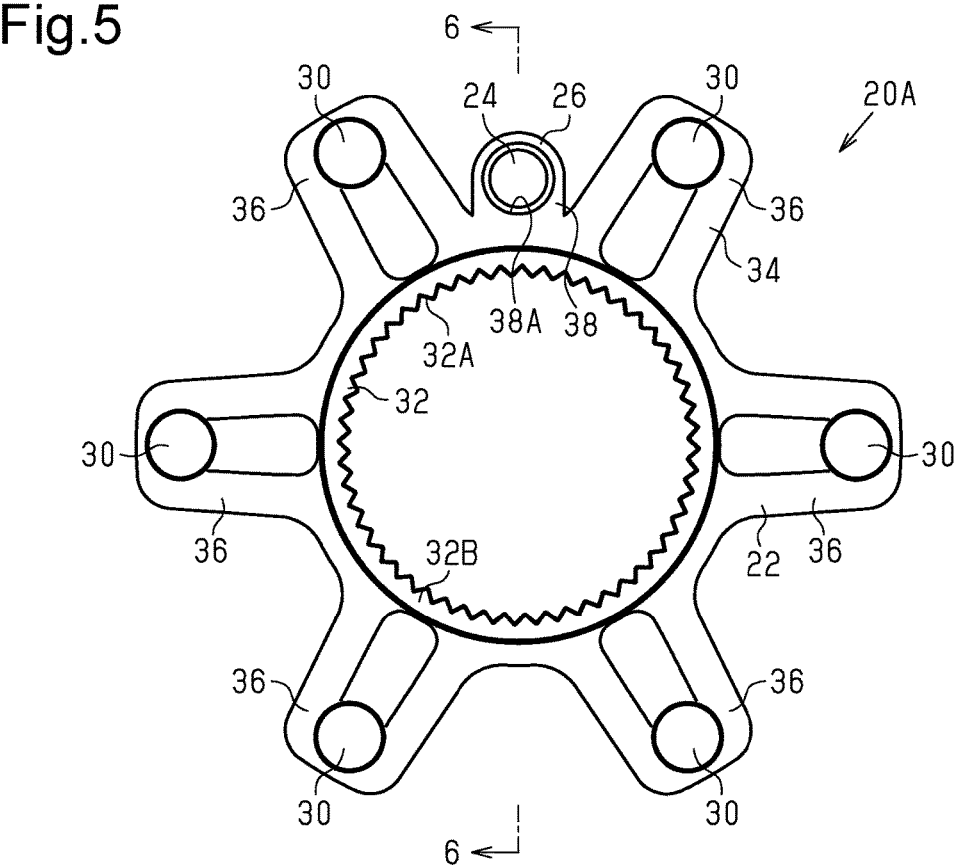
FIG. 5 is a side elevational view of the disc brake adapter with the bicycle magnetism generation device as viewed in a second direction in FIG. 1.

The adapter 20A is configured to attach the main body 12 of the disc brake rotor 10 to the hub H (refer to FIG. 2) of a bicycle. As shown in FIG. 4, the adapter 20A includes an adapter main body 22, a magnetism generation portion 24 and an attaching portion 26. In one example, the adapter 20A further includes a thermal insulation portion 28 (refer to FIG. 6) and fastening portions 30.

The adapter main body 22 is formed from a metal. The adapter main body 22 includes steel or an aluminum alloy. It is preferred that the adapter main body 22 be formed from a low permeability material. The adapter main body 22 includes an inner portion 32 and an outer portion 34. The inner portion 32 includes the second spline 32A. The second spline 32A is configured to be engaged with the first spline H3, which is provided on the hub H shown in FIG. 2. The inner portion 32 has one end 32B in the axial direction. In a state where the disc brake rotor 10 is coupled to the hub H, the one end 32B is in contact with the projection H5 of the hub shell H1. It is preferred that the end surface of the one end 32B of the inner portion 32 in the axial direction be included in a plane that is orthogonal to the axial direction. As shown in FIG. 1, the outer portion 34 is located at a radially outer side of the inner portion 32. The main body 12 of the disc brake rotor 10 is coupled to the outer portion 34. The outer portion 34 includes a plurality of projections 36, which project outward in the radial direction. The main body 12 of the disc brake rotor 10 is coupled to the projections 36.

The projections 36 are provided at predetermined intervals in the circumferential direction of the disc brake rotor 10. In the description hereafter, the circumferential direction of the disc brake rotor 10 is simply referred to as "the circumferential direction." The number of projections 36 is, for example, six. As shown in FIG. 3, each of the projections 36 includes a first hole 36A, which is used for attachment of the main body 12 of the disc brake rotor 10. The first holes 36A extend in a direction parallel to the axial direction. The first holes 36A are formed in the distal end of each projection 36. It is preferred that the first holes 36A extend through the projections 36 in the axial direction. The first holes 36A are formed in positions corresponding to the second holes 12B, which are formed in the main body 12 of the disc brake rotor 10. The fastening portions 30 are inserted into the first holes 36A and the second holes 12B. The fastening portions 30 include, for example, rivets. The fastening portions 30 fasten the main body 12 of the disc brake rotor 10 and the adapter 20A to each other. The fastening portions 30 can include bolts. In a case where the fastening portions 30 include bolts, the second holes 12B are, for example, defined by threaded wall surfaces configured to be coupled to the bolts. With the bolts inserted into the second holes 12B, the main body 12 is held between the head of each bolt and the corresponding projection 36. This fixes the main body 12.

Figure 6:
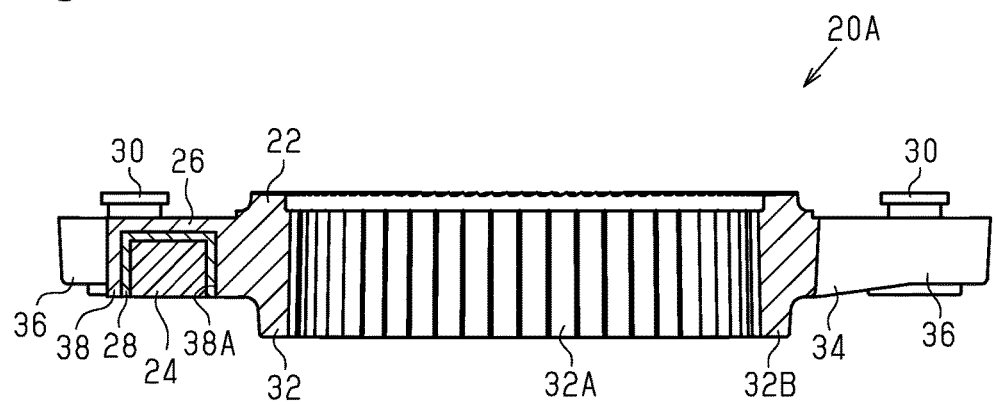
FIG. 6 is a cross-sectional view of the disc brake adapter taken along section line 6-6 in FIG. 5.

The attaching portion 26 attaches the magnetism generation portion 24 to the adapter main body 22 in a manner irrelevant to the fixing function of the fixing member R. The attaching portion 26 is provided between two of the projections 36 that are adjacent to each other in the circumferential direction. As shown in FIG. 6, the attaching portion 26 is formed integrally with the adapter main body 22. The attaching portion 26 includes a holder 38, which holds the magnetism generation portion 24. The holder 38 includes a recess 38A. The recess 38A is open at one side in the axial direction. In a state where the disc brake rotor 10 is coupled to the hub H, the opening of the recess 38A is located toward the second end H6 of the hub shell H1 of the hub H. In this case, it is preferred that the adapter main body 22 be formed from a low permeability material such as an aluminum alloy. In a case where the adapter main body 22 is formed from a low permeability material, the opening of the recess 38A can be formed at a radially outer side with the disc brake rotor 10 coupled to the hub H. In a state where the adapter main body 22 couples the disc brake rotor 10 to the hub H, the opening of the recess 38A can be located at a side opposite to the second end H6 of the hub shell H1 of the hub H. In a case where the adapter main body 22 is formed from a high permeability material, it is preferred that the opening of the recess 38A be located at the side opposite to the second end H6 of the hub shell H1 of the hub H with the disc brake rotor 10 coupled to the hub H.

The magnetism generation portion 24 is accommodated in the recess 38A. It is preferred that the entire magnetism generation portion 24 be accommodated in the recess 38A. However, the magnetism generation portion 24 can partially project from the recess 38A. The magnetism generation portion 24 includes at least one permanent magnet. The magnetism generation portion 24 is provided between two adjacent ones of the projections 36. Although there is no limitation on the shape of the permanent magnet, the permanent magnet is, for example, tubular. The permanent magnet is provided in the recess 38A so that magnetic poles are located next to one another in the axial direction. The magnetism generation portion 24 is provided between two of the projections 36 that are adjacent to each other in the circumferential direction. The thermal insulation portion 28 is located between the magnetism generation portion 24 and the attaching portion 26 to limit heat transfer. In one example, the thermal insulation portion 28 includes a resin. It is preferred that the thermal insulation portion 28 be formed from a low permeability material. The thermal insulation portion 28 and the magnetism generation portion 24 are held in the recess 38A through light press-fitting or by an adhesive. The magnetism generation portion 24 can be molded by a resin.

Second Embodiment

A second embodiment of an adapter 20B will now be described with reference to FIGS. 7 and 8. The adapter 20B of the second embodiment is the same as the adapter 20A of the first embodiment except that the adapter 20B includes an attaching portion 42 that is formed separately from the adapter main body 22. The same reference characters are given to those elements that are the same as the corresponding elements of the first embodiment. Such elements will not be described in detail.

Figure 7:
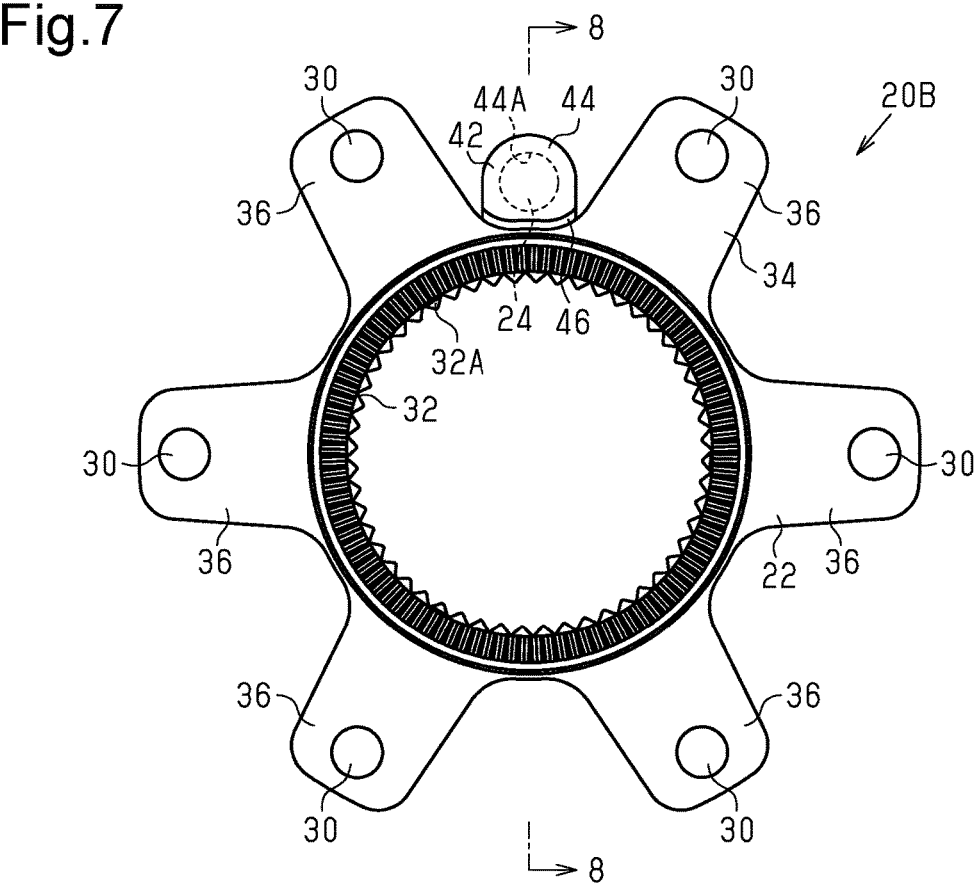
FIG. 7 is a side elevational view of a disc brake adapter having a bicycle magnetism generation device in accordance with a second embodiment as viewed in the second direction.

As shown in FIG. 7, the attaching portion 42 is provided between two adjacent ones of the projections 36. The attaching portion 42 is formed separately from the adapter main body 22. The attaching portion 42 attaches the magnetism generation portion 24 to the adapter main body 22 in a manner irrelevant to the fixing function of the fixing member R. The attaching portion 42 includes a holder 44 and an engagement portion 46. The holder 44 is formed from a metal or a resin. It is preferred that the holder 44 be formed from a low permeability material. The holder 44 includes a recess 44A. The recess 44A is open at one side in the axial direction. In a state where the disc brake rotor 10 is coupled to the hub H, the opening of the recess 44A is located toward the second end H6 of the hub shell H1 of the hub H. In a state where the disc brake rotor 10 is coupled to the hub H, the opening of the recess 44A can be formed at a side opposite to the second end H6 of the hub shell H1 of the hub H. In a case where the holder 44 is formed from a high permeability material, it is preferred that the opening of the recess 44A be formed at the side opposite to the second end H6 of the hub shell H1 of the hub H with the disc brake rotor 10 coupled to the hub H. The engagement portion 46 engages the adapter main body 22. The engagement portion 46 includes, for example, an adhesive. The engagement portion 46 fixes the holder 44 to the outer portion 34. In a case where the holder 44 is formed from a low permeability material such as an aluminum alloy or a resin, the opening of the recess 44A can be formed at an outer side or an inner side in the radial direction.

Figure 8:
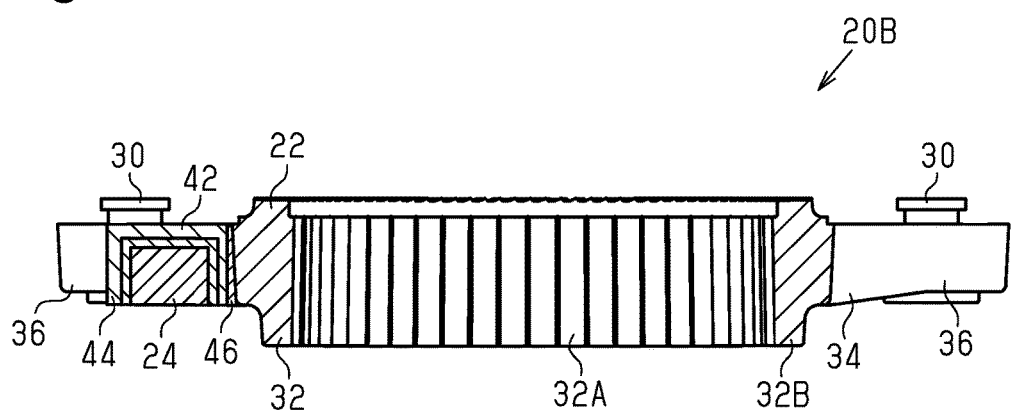
FIG. 8 is a cross-sectional view of the disc brake adapter having a bicycle magnetism generation device taken along section line 8-8 in FIG. 7.

As shown in FIG. 8, the magnetism generation portion 24 is accommodated in the recess 44A. It is preferred that the entire magnetism generation portion 24 be accommodated in the recess 44A. However, the magnetism generation portion 24 can partially project from the recess 44A. The holder 44 and the engagement portion 46 limit heat transfer between the adapter main body 22 and the magnetism generation portion 24. Since the attaching portion 42 functions as a heat insulation portion, the thermal insulation portion 28 of the first embodiment can be omitted from the adapter 20B of the second embodiment. However, the thermal insulation portion 28 can be provided between the attaching portion 42 and the magnetism generation portion 24.

Third Embodiment

A third embodiment of an adapter 20C will now be described with reference to FIGS. 9 and 10. The adapter 20C of the third embodiment is the same as the adapter 20A of the first embodiment except that at least one of the fastening portions 30 is changed to a joining portion 54, the magnetism generation portion 24 is provided on one of the projections 36, and the adapter 20C includes an attaching portion 48 that is formed separately from the adapter main body 22. The same reference characters are given to those elements that are then same as the corresponding elements of the first embodiment. Such elements will not be described in detail.

Figure 9:
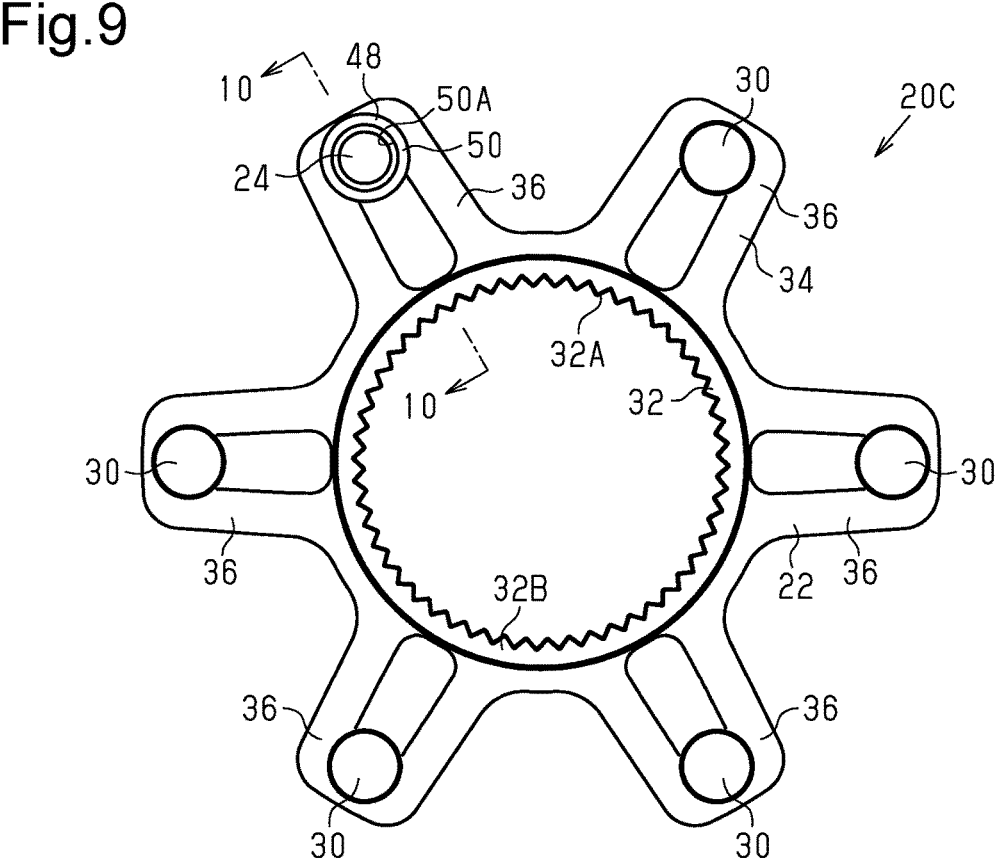
FIG. 9 is a side elevational view of a disc brake adapter having a bicycle magnetism generation device in accordance with a third embodiment as viewed in the second direction.
Figure 10:
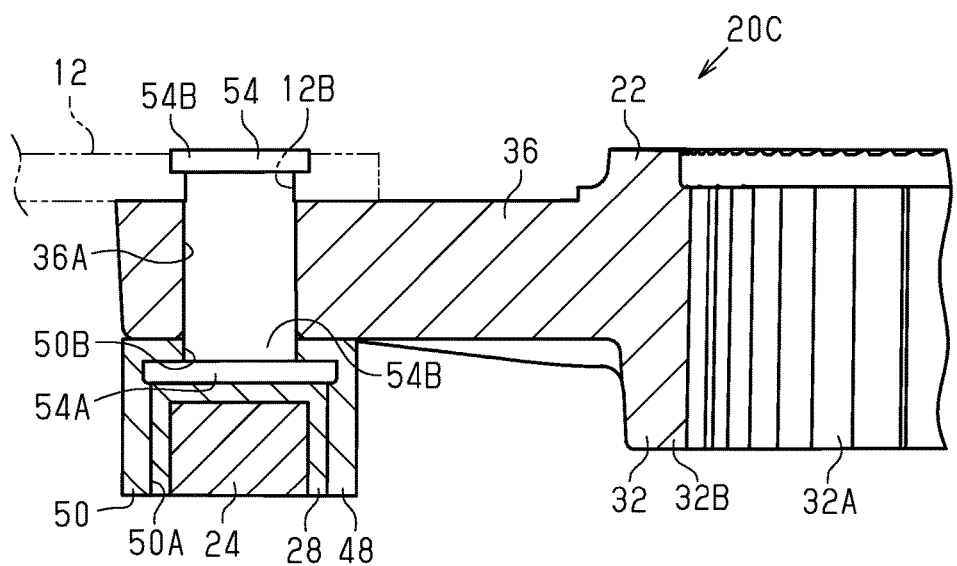
FIG. 10 is an enlarged, partial cross-sectional view of the disc brake adapter and the bicycle magnetism generation device taken along section line 10-10 in FIG. 9.

As shown in FIG. 9, the attaching portion 48 is provided on one of the projections 36. The attaching portion 48 attaches the magnetism generation portion 24 to the adapter main body 22 in a manner irrelevant to the fixing function of the fixing member R. The attaching portion 48 is formed separately from the adapter main body 22. The attaching portion 48 includes a holder 50. In one example, the attaching portion 48 further includes the joining portion 54. The joining portion 54 includes a rivet in the same manner as the fastening portions 30. The holder 50 is formed from a metal or a resin. In a state where the disc brake rotor 10 is coupled to the hub H, the holder 50 is located toward the second end H6 of the hub shell H1 of the hub H. The holder 50 includes a recess 50A. In a state where the disc brake rotor 10 is coupled to the hub H, the opening of the recess 50A is formed toward the second end H6 of the hub shell H1 of the hub H. A through hole 50B extends through the bottom of the recess 50A toward the adapter main body 22. The magnetism generation portion 24 and the joining portion 54 are located at positions that overlap with each other in the axial direction. In another example, the magnetism generation portion 24 and the joining portion 54 are located at positions that do not overlap with each other in the axial direction. In this case, the holder 50 extends for example, radially inward or outward from the joining portion 54 or either side in the axial direction. The recess 50A is formed in a position that does not overlap the joining portion 54.

The attaching portion 48 is inserted into one of the first holes 36A and fixed to the corresponding one of the projections 36. As shown in FIG. 10, the joining portion 54 is inserted into the first hole 36A and one of the second holes 12B, which are formed in the main body 12 of the disc brake rotor 10, to join the projection 36 and the main body 12 of the disc brake rotor 10. The joining portion 54 has a first end 54A, which is inserted through the through hole 50B and located in the cavity of the recess 50A. The holder 50 is held between the projection 36 and a portion of the first end 54A located in the cavity of the recess 50A. This supports the holder 50.

The magnetism generation portion 24 is accommodated in the recess 50A. It is preferred that the entire magnetism generation portion 24 be accommodated in the recess 50A. However, the magnetism generation portion 24 can partially project from the recess 50A. The magnetism generation portion 24 is provided on the projection 36. The thermal insulation portion 28 is located between the magnetism generation portion 24 and the attaching portion 48 to limit heat transfer.

Fourth Embodiment

A fourth embodiment of an adapter 20D will now be described with reference to FIGS. 11 and 12. The adapter 20D of the fourth embodiment is the same as the adapter 20A of the first embodiment except that the adapter 20D includes an attaching portion 56 that is fixed to one of the projections 36, and the attaching portion 56 is formed separately from the adapter main body 22. The same reference characters are given to those elements that are the same as the corresponding elements of the first embodiment. Such elements will not be described in detail.

Figure 11:
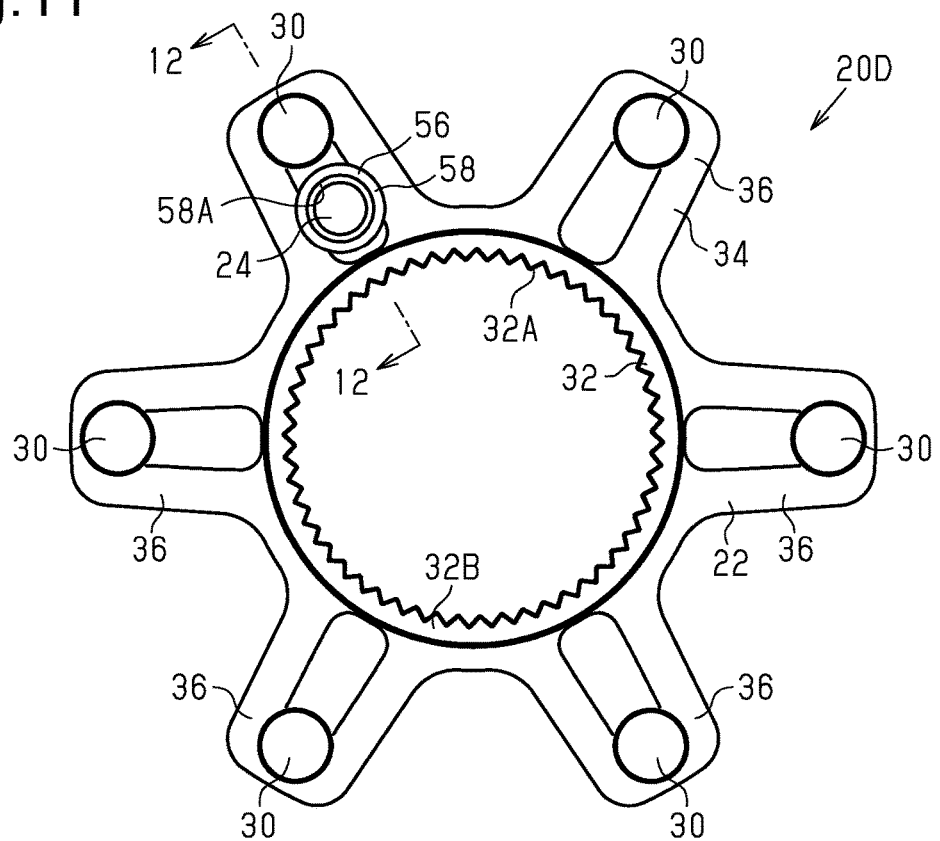
FIG. 11 is a side elevational view of a disc brake adapter having a bicycle magnetism generation device in accordance with a fourth embodiment as viewed in the second direction.

As shown in FIG. 11, the attaching portion 56 is provided on one of the projections 36. The attaching portion 56 attaches the magnetism generation portion 24 to the adapter main body 22 in a manner irrelevant to the fixing function of the fixing member R. The attaching portion 56 is formed separately from the adapter main body 22. The attaching portion 26 is configured to be attachable to and removable from the adapter main body 22. The attaching portion 56 includes a holder 58 and an engagement portion 60 (refer to FIG. 12). The holder 58 includes a recess 58A. The holder 58 is formed from a metal or a resin. In a state where the disc brake rotor 10 is coupled to the hub H, the holder 58 is located toward the second end H6 of the hub shell H1 of the hub H. In a state where the disc brake rotor 10 is coupled to the hub H, the opening of the recess 58A is located toward the second end H6 of the hub shell H1 of the hub H. In this case, it is preferred that the holder 58 be formed from a low permeability material such as an aluminum alloy or a resin. In another example, in a state where the disc brake rotor 10 is coupled to the hub H, the holder 58 is located at a side opposite to the second end H6 of the hub shell H1 of the hub H. In a state where the disc brake rotor 10 is coupled to the hub H, the opening of the recess 58A is located at the side opposite to the second end H6 of the hub shell H1 of the hub H. In a case where the holder 58 is formed from a low permeability material such as an aluminum alloy or a resin, the opening of the recess 58A can be formed at one of a radially inner side, a radially outer side, and one side or the other side in the circumferential direction. The magnetism generation portion 24 is accommodated in the recess 58A. It is preferred that the entire magnetism generation portion 24 be accommodated in the recess 58A. However, the magnetism generation portion 24 can partially project from the recess 58A. The thermal insulation portion 28 is located between the magnetism generation portion 24 and the holder 58 to limit heat transfer.

Figure 12:
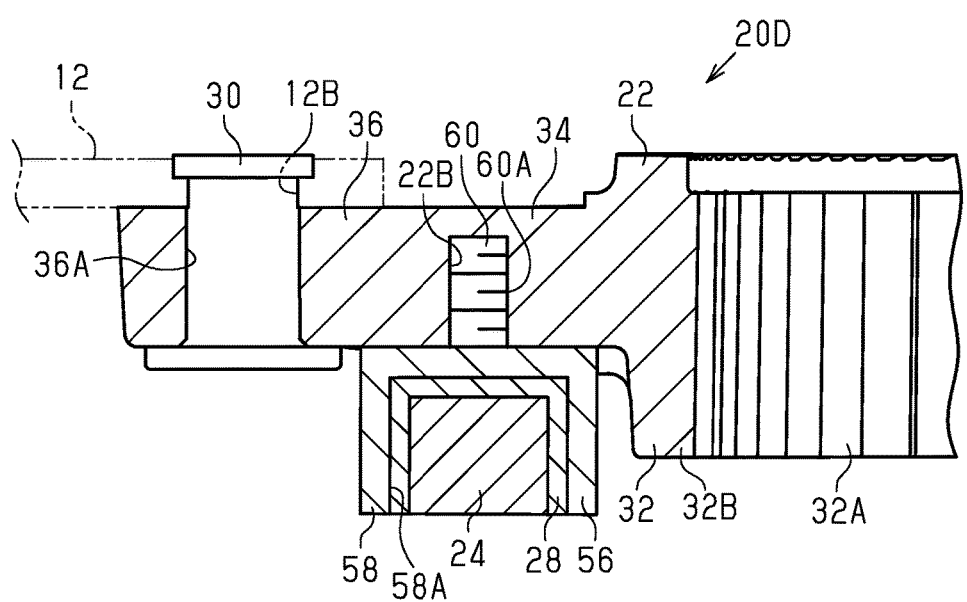
FIG. 12 is a cross-sectional view of the disc brake adapter and the bicycle magnetism generation device taken along section line 12-12 in FIG. 11.

As shown in FIG. 12, the engagement portion 60 includes a first threaded part 60A. The adapter main body 22 includes a second threaded part 22B, which engages the first threaded part 60A. The first threaded part 60A is externally threaded. The second threaded part 22B is internally threaded. The second threaded part 22B is formed in one of the projections 36 at an inner side of the first hole 36A in the radial direction. The threaded hole of the second threaded part 22B extends parallel to the axial direction. In a state where the disc brake rotor 10 is coupled to the hub H, the threaded hole is open toward the second end H6 of the hub shell H1 of the hub H. In a case where the holder 58 is located at a side opposite to the second end H6 of the hub shell H1, the threaded hole of the second threaded part 22B is open toward the side opposite to the second end H6 of the hub shell H1. The threaded hole of the second threaded part 22B can extend parallel to the axial direction through the projection 36. The engagement portion 60 can be formed integrally with the holder 58. Alternatively, the engagement portion 60 can be formed separately from the holder 58 and coupled to the holder 58. The first threaded part 60A is fastened to the second threaded part 22B to couple the magnetism generation portion 24 to the adapter main body 22. The threaded hole of the second threaded part 22B can extend in a direction that intersects the axial direction.

Fifth Embodiment

A fifth embodiment of an adapter 20E will now be described with reference to FIGS. 13 and 14. The adapter 20E of the fifth embodiment is the same as the adapter 20A of the first embodiment except that the adapter 20E includes an attaching portion 62 that is fixed to one of the projections 36, and the attaching portion 62 is formed separately from the adapter main body 22. The same reference characters are given to those elements that are the same as the corresponding elements of the first embodiment. Such elements will not be described in detail.

Figure 13:
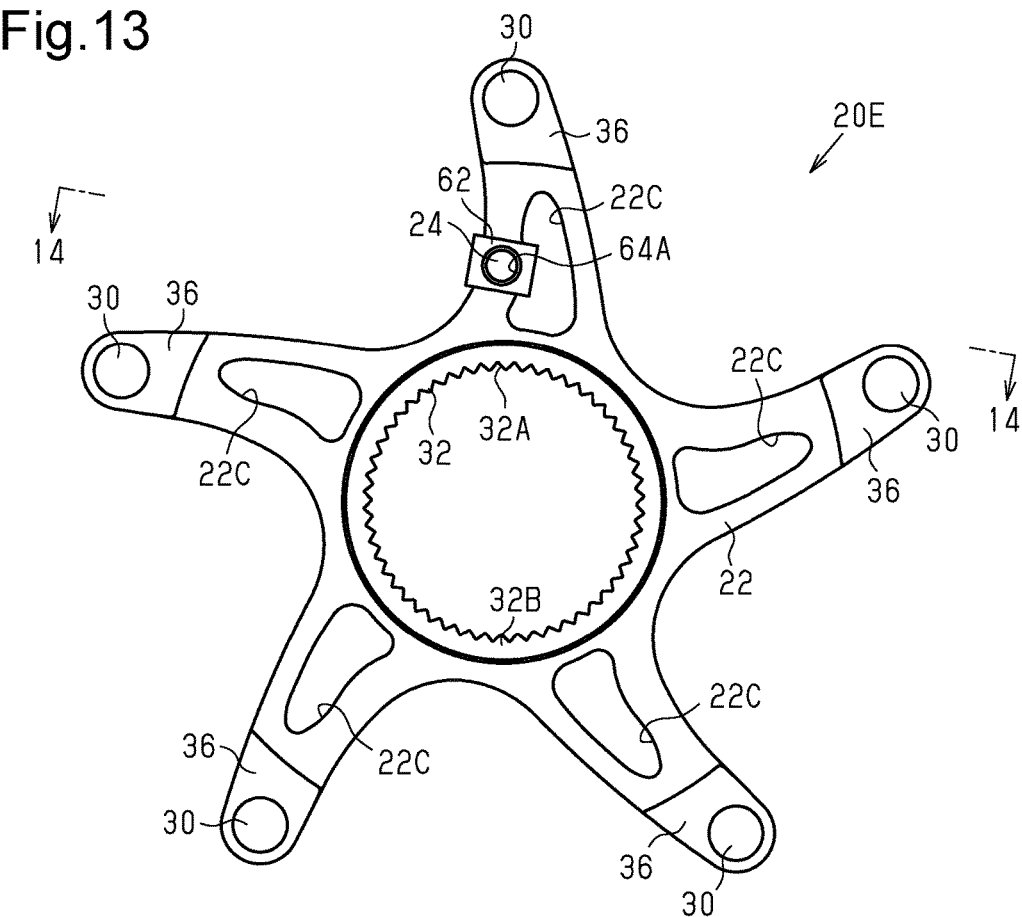
FIG. 13 is a side elevational view of a disc brake adapter having a bicycle magnetism generation device in accordance with a fifth embodiment as viewed in the second direction.

As shown in FIG. 13, the attaching portion 62 is provided on one of the projections 36. The attaching portion 62 attaches the magnetism generation portion 24 to the adapter main body 22 in a manner irrelevant to the fixing function of the fixing member R. The attaching portion 62 is formed separately from the adapter main body 22. The attaching portion 62 is configured to be attachable to and removable from the adapter main body 22. The attaching portion 62 includes a holder 64 and an engagement portion 66 (refer to FIG. 14). The holder 64 includes a recess 64A. The holder 64 is formed from a metal or a resin. In a state where the disc brake rotor 10 is coupled to the hub H, the holder 64 is located toward the second end H6 of the hub shell H1 of the hub H. In a state where the disc brake rotor 10 is coupled to the hub H, the opening of the recess 64A is located toward the second end H6 of the hub shell H1 of the hub H. In this case, it is preferred that the holder 64 be formed from a low permeability material such as an aluminum alloy or a resin. In another example, in a state where the disc brake rotor 10 is coupled to the hub H, the opening of the recess 64A is formed at a side opposite to the second end H6 of the hub shell H1 of the hub H. In a case where the holder 64 is formed from a low permeability material such as an aluminum alloy or a resin, the opening of the recess 64A can be formed at one of a radially inner side, a radially outer side, and one side or the other side in the circumferential direction. In a state where the disc brake rotor 10 is coupled to the hub H, the holder 64 can be located at the side opposite to the second end H6 of the hub shell H1 of the hub. The magnetism generation portion 24 is accommodated in the recess 64A. It is preferred that the entire magnetism generation portion 24 be accommodated in the recess 64A. However, the magnetism generation portion 24 can partially project from the recess 64A.

Figure 14:
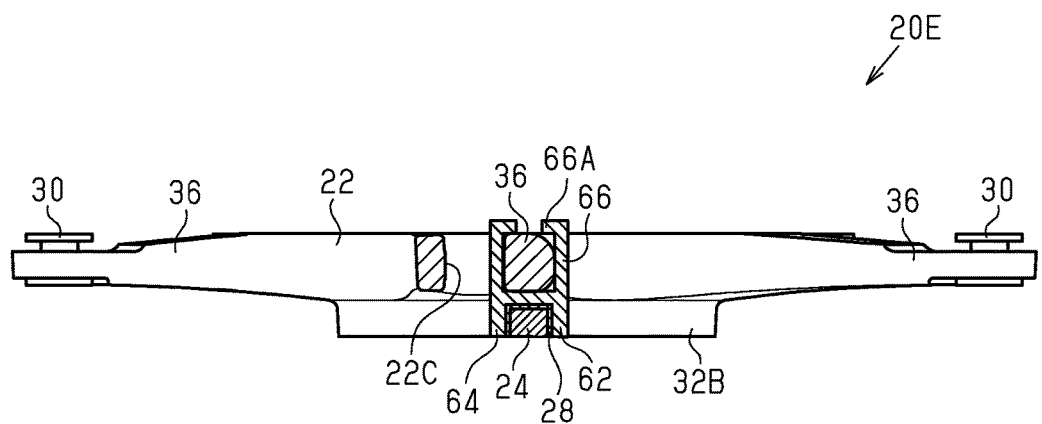
FIG. 14 is a cross-sectional view of the disc brake adapter and the bicycle magnetism generation device taken along section line 14-14 in FIG. 13.

As shown in FIG. 14, the engagement portion 66 includes two hooks 66A, which extend from the holder 64 in the axial direction. One of the two hooks 66A is inserted into one of through holes 22C, which extend through the projections 36. The other one of the two hooks 66A is located at an outer side of the projection 36 in the circumferential direction. The projection 36 is held between the two hooks 66A. This fixes the holder 64 to the projection 36. The engagement portion 66 can be formed separately from the hooks 66A and coupled to the hooks 66A. Alternatively, the engagement portion 66 can be formed integrally with the hooks 66A.

Figure 15:
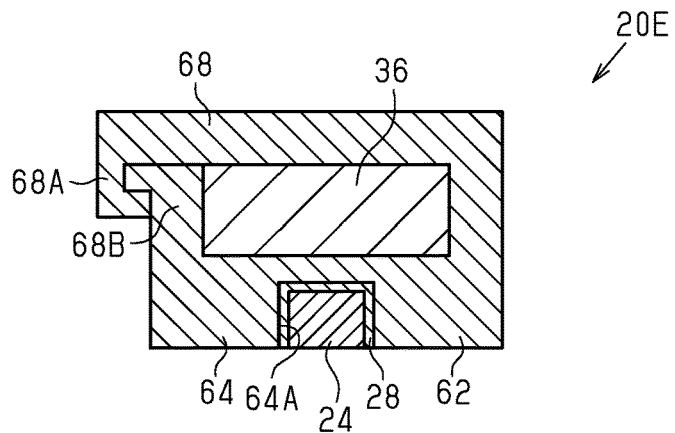
FIG. 15 is an enlarged, partial cross-sectional view of a modified disc brake adapter in accordance with a modification of the fifth embodiment.

As shown in FIG. 15, instead of the engagement portion 66, the attaching portion 62 can include an engagement portion 68 that has one end 68A and the other end 68B in the circumferential direction and is annular with the one end 68A coupled to the other end 68B. In a state where the one end 68A is separated from the other end 68B, the projection 36 is engaged with an inner side of the engagement portion 68. Then, the one end 68A is coupled to the other end 68B to fix the holder 64 to the projection 36. The one end 68A and the other end 68B include a recess and a projection that engage with each other.

Sixth Embodiment

Figure 16:
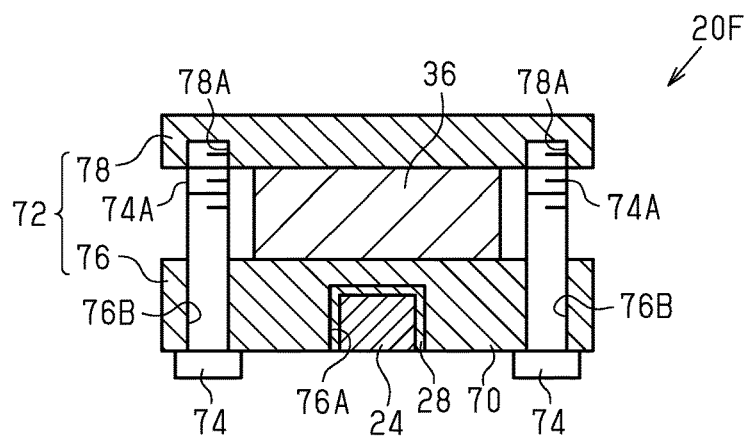
FIG. 16 is an enlarged, partial cross-sectional view of a disc brake adapter having a bicycle magnetism generation device in accordance with a sixth embodiment.

A sixth embodiment of an adapter 20F will now described with reference to FIG. 16. The adapter 20F of the sixth embodiment is the same as the adapter 20E of the fifth embodiment except that a holder 72 and engagement portions 74 are separate from each other. The same reference characters are given to those elements that are the same as the corresponding elements of the fifth embodiment. Such elements will not be described in detail.

An attaching portion 70 includes the holder 72 and the engagement portions 74. The attaching portion 70 attaches the magnetism generation portion 24 to the adapter main body 22 in a manner irrelevant to the fixing function of the fixing member R. The holder 72 includes a first portion 76 and a second portion 78, which are located at opposite sides of the projection 36. In a state where the disc brake rotor 10 is coupled to the hub H, the first portion 76 is located at a side of the projection 36 closer to the second end H6 of the hub shell H1 of the hub H. The first portion 76 includes a recess 76A. In a state where the disc brake rotor 10 is coupled to the hub H, the second portion 78 is located at a side opposite to the second end H6 of the hub shell H1 of the hub H. In a state where the disc brake rotor 10 is coupled to the hub H, the opening of the recess 76A is located toward the second end H6 of the hub shell H1 of the hub H. In this case, it is preferred that the first portion 76 be formed from a low permeability material such as an aluminum alloy or a resin. In another example, the first portion 76 and the opening of the recess 76A are located at the side opposite to the second end H6 of the hub shell H1, and the second portion 78 is located toward the second end H6 of the hub shell H1. In a case where the holder 72 is formed from a low permeability material such as an aluminum alloy or a resin, the opening of the recess 76A can be formed at one of a radially inner side, a radially outer side, and one side or the other side in the circumferential direction. The magnetism generation portion 24 is accommodated in the recess 76A. It is preferred that the entire magnetism generation portion 24 be accommodated in the recess 76A. However, the magnetism generation portion 24 can partially project from the recess 64A. The thermal insulation portion 28 is located between the magnetism generation portion 24 and the attaching portion 70 to limit heat transfer.

The engagement portions 74 are formed separately from the holder 72. Each engagement portion 74 includes a first threaded part 74A. The engagement portion 74 is formed by a bolt. The holder 72 includes first through holes 76B through which the engagement portions 74 extend, and third threaded parts 78A engaged with the first threaded parts 74A in a state where the engagement portions 74 extend through the first through holes 76B. The first through holes 76B are formed in the first portion 76. The third threaded parts 78A are formed in the second portion 78. The threaded hole of each third threaded part 78A can extend through the second portion 78. The attaching portion 70 includes a plurality of engagement portions 74. The holder 72 includes the first through holes 76B and the third threaded parts 78A in conformance with the number of the engagement portions 74. At least two of the engagement portions 74 are located at positions where the projection 36 is held between the engagement portions 74 in the circumferential direction. In a state where the projection 36 is held between the first portion 76 and the second portion 78, the engagement portions 74 extend through the first through holes 76B, and the first threaded parts 74A are fastened to the third threaded parts 78A. This fixes the attaching portion 70 to the projection 36.

Figure 17:
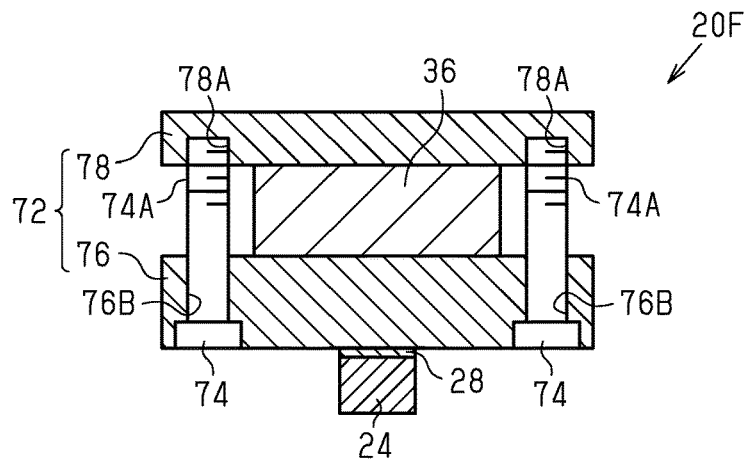
FIG. 17 is an enlarged, partial cross-sectional view of a modified disc brake adapter having a bicycle magnetism generation device in accordance with a modification of the sixth embodiment.

As shown in FIG. 17, in the adapter 20F, the diameter of each first through hole 76B can be enlarged at the end located closer to the second end H6 of the hub shell H1 of the hub H so that the end of each engagement portion 74 will not project from the first portion 76 in a state where the disc brake rotor 10 is coupled to the hub H. Additionally, the recess 76A can be omitted from the first portion 76. The magnetism generation portion 24 and the thermal insulation portion 28 can be provided on a surface of the first portion 76 that is opposite to the projection 36.

Seventh Embodiment

Figure 18:
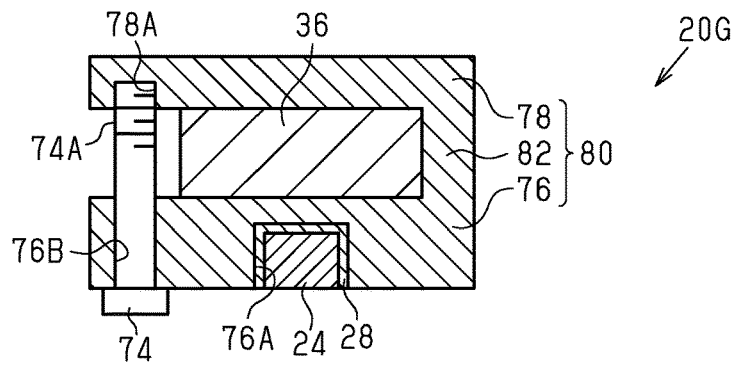
FIG. 18 is an enlarged, partial cross-sectional view of a disc brake adapter having a bicycle magnetism generation device in accordance with a seventh embodiment.

A seventh embodiment of an adapter 20G will now be described with reference to FIG. 18. The adapter 20G of the seventh embodiment is the same as the adapter 20F of the sixth embodiment except that a holder 80 includes the first portion 76 and the second portion 78 that are connected to each other. The same reference characters are given to those elements that are the same as the corresponding elements of the sixth embodiment. Such elements will not be described in detail.

The holder 80 includes the first portion 76, the second portion 78, and a third portion 82. The third portion 82 connects an end of the first portion 76 and an end of the second portion 78 in the circumferential direction. The third portion 82 extends parallel to the axial direction. The holder 80 has a U-shaped cross section in a direction orthogonal to the radial direction. The third portion 82 is located at one side of the projection 36 in the circumferential direction. The engagement portion 74 extends through the first through hole 76B of the first portion 76 at the other side of the projection 36 in the circumferential direction. The first threaded part 74A is fastened to the third threaded part 78A.

Figure 19:
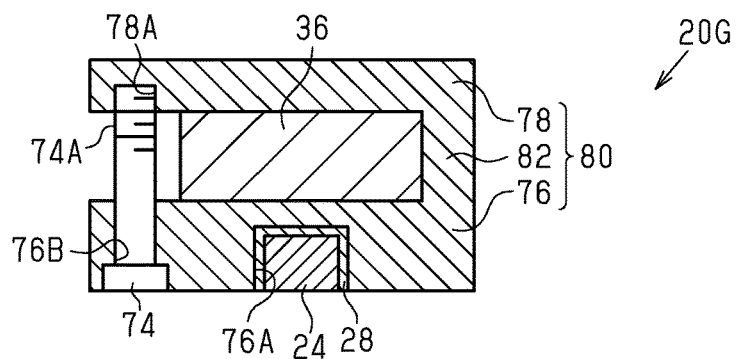
FIG. 19 is an enlarged, partial cross-sectional view of a disc brake adapter having a bicycle magnetism generation device in accordance with a modification of the seventh embodiment.

As shown in FIG. 19, in the adapter 20G, the diameter of the first through hole 76B can be enlarged at the end located closer to the second end H6 of the hub shell H1 of the hub H so that the end of the engagement portion 74 will not project from the first portion 76 in a state where the disc brake rotor 10 is coupled to the hub H. Additionally, the recess 76A can be omitted from the first portion 76. The magnetism generation portion 24 and the thermal insulation portion 28 are provided on a surface of the first portion 76 that is opposite to the projection 36.

Eighth Embodiment

An eighth embodiment of an adapter 20H will now be described with reference to FIG. 20. The adapter 20H of the eighth embodiment is the same as the adapter 20A of the first embodiment except that the adapter 20H includes an attaching portion 84 that is fixed to one of the projections 36, and the attaching portion 84 is formed separately from the adapter main body 22. The same reference characters are given to those elements that are the same as the corresponding elements of the first embodiment. Such elements will not be described in detail.

In the adapter 20H, an engagement portion 88 and a holder 86 are formed separately from each other. The attaching portion 84 of the adapter 20H includes the holder 86 and the engagement portion 88. The attaching portion 84 attaches the magnetism generation portion 24 to the adapter main body 22 in a manner irrelevant to the fixing function of the fixing member R. The attaching portion 84 is provided on one of the projections 36. The engagement portion 88 includes a first threaded part 88A. The attaching portion 84 is configured to be attachable to and removable from the adapter main body 22. The adapter main body 22 includes a second through hole 22D through which the engagement portion 88 extends. The second through hole 22D extends in the axial direction. The holder 86 includes a fourth threaded part 86B engaged with the first threaded part 88A in a state where the engagement portion 88 extends through the second through hole 22D.

The holder 86 includes a recess 86A. The holder 86 is formed from a metal or a resin. In a state where the disc brake rotor 10 is coupled to the hub H, the holder 86 is located toward the second end H6 of the hub shell H1 of the hub H. In a state where the disc brake rotor 10 is coupled to the hub H, the opening of the recess 86A is located toward the second end H6 of the hub shell H1 of the hub H. In this case, it is preferred that the holder 86 be formed from a low permeability material such as an aluminum alloy or a resin. In another example, in a state where the disc brake rotor 10 is coupled to the hub H, the holder 86 is located at a side opposite to the second end H6 of the hub shell H1 of the hub H. In a state where the disc brake rotor 10 is coupled to the hub H, the opening of the recess 86A is located at the side opposite to the second end H6 of the hub shell H1 of the hub H. In a case where the holder 86 is formed from a low permeability material, the opening of the recess 86A can be formed at one of a radially inner side, a radially outer side, and one side or the other side in the circumferential direction. The magnetism generation portion 24 is accommodated in the recess 86A. It is preferred that the entire magnetism generation portion 24 be accommodated in the recess 86A. However, the magnetism generation portion 24 can partially project from the recess 86A. The thermal insulation portion 28 is located between the magnetism generation portion 24 and the holder 86 to limit heat transfer.

The first threaded part 88A is externally threaded. The fourth threaded part 86B is internally threaded. The engagement portion 88 extends through the second through hole 22D from a side of the holder 86 opposite to the projection 36 in the axial direction. The first threaded part 88A is fastened to the fourth threaded part 86B. This fixes the attaching portion 84 to the projection 36. The engagement portion 88 is formed by a bolt. The projection 36 is held between the head of the bolt and the holder 86. This restricts movement of the holder 86 in the axial direction.

Modifications

The above description illustrates embodiments of a disc brake rotor adapter, a disc brake rotor including the adapter, and a magnetism generation device according to the present invention and is not intended to be restrictive. The disc brake rotor adapter, the disc brake rotor including the adapter, and the magnetism generation device according to the present invention can be modified as follows. Further, two or more of the modifications can be combined. In the modifications, the same reference characters are given to those elements that are the same as the corresponding elements of the embodiments. Such elements will not be described in detail.

Figure 21:
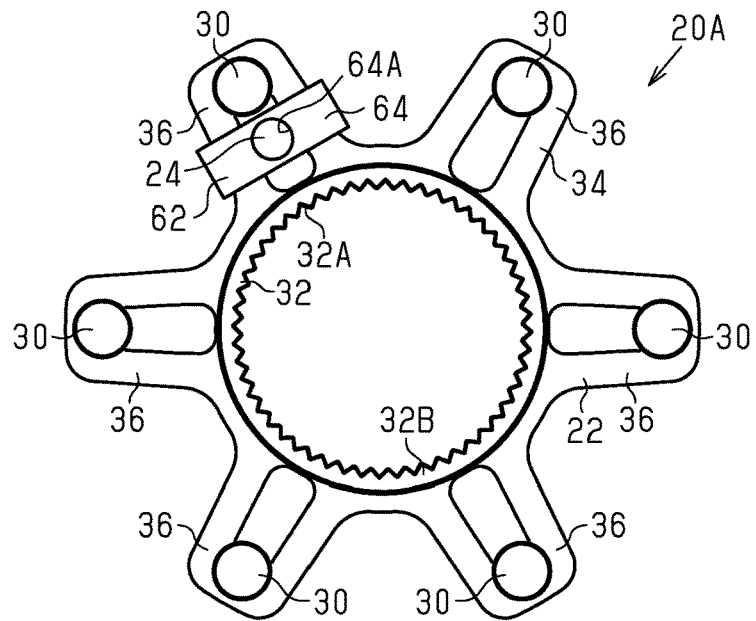
FIG. 21 is a side elevational view of a disc brake adapter in accordance with a first modification as viewed in the second direction.

The attaching portions 62, 70 of the fifth to seventh embodiments can be coupled to the adapter main bodies 22 of the first to fourth embodiments, which do not include the through holes 22C. For example, as shown in FIG. 21, the attaching portion 62 is configured to surround a radially intermediate portion of one of the projections 36 of the adapter main body 22.

Figure 20:
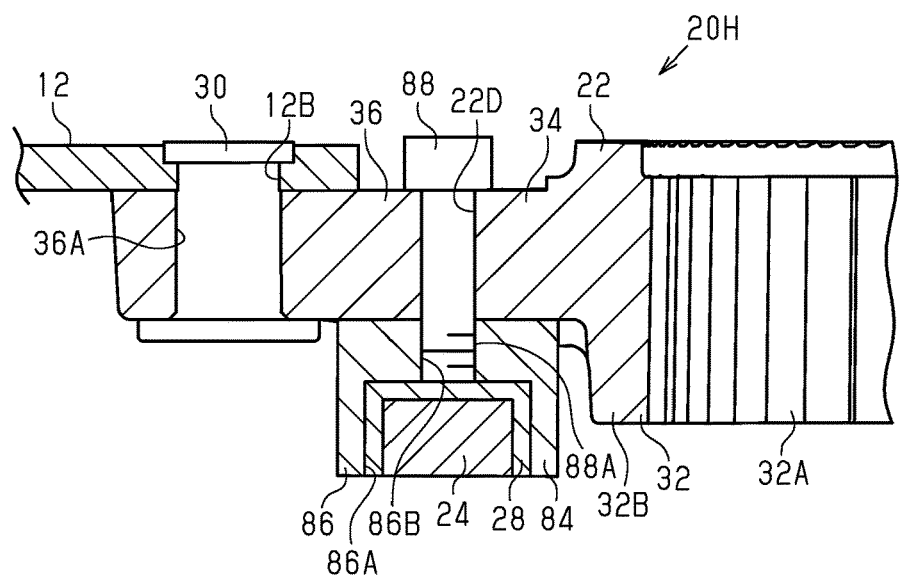
FIG. 20 is an enlarged, partial cross-sectional view of a disc brake adapter having a bicycle magnetism generation device in accordance with an eighth embodiment.
Figure 22:
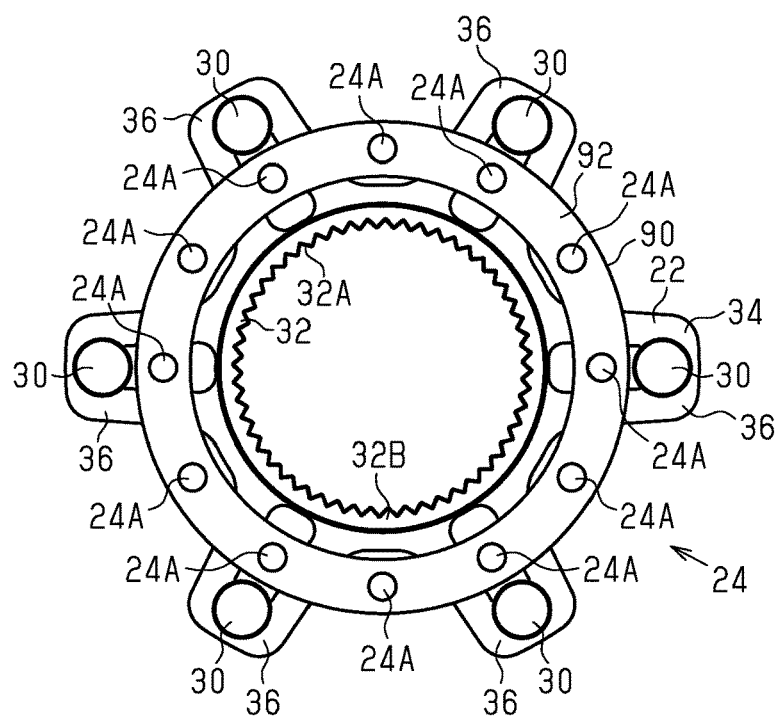
FIG. 22 is a side elevational view of a disc brake adapter in accordance with a second modification as viewed in the second direction.

The attaching portion 84 that is shown in FIG. 20 can be changed to an attaching portion 90 that includes an annular base 92 and is shown in FIG. 22. The inner diameter of the base 92 is larger than the inner diameter of the inner portion 32 of the adapter main body 22 and the outer diameter of the fixing member R. It is preferred that the size of the outer diameter of the base 92 be selected so that the outer circumference of the base 92 is located at an inner side of the fastening portions 30 in the radial direction. It is preferred that the base 92 be fixed to two or more of the projections 36 by the engagement portion 88 that is shown in FIG. 20. The magnetism generation portion 24 includes a plurality of permanent magnets 24A, which are spaced apart from one another in a circumferential direction of the base 92. The base 92 includes the recesses 86A, which are spaced apart from one another in the circumferential direction. The permanent magnets 24A are respectively accommodated in the recesses 86A.

Figure 23:
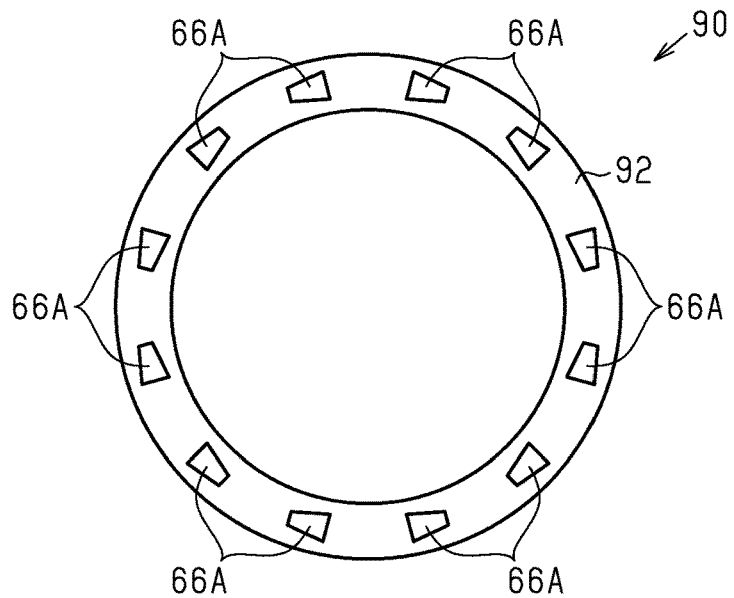
FIG. 23 is a side elevational view of an attaching portion of a disc brake adapter in accordance with a third modification as viewed in the first direction.

Instead of fixing the attaching portion 90 to the adapter main body 22 with the engagement portion 88 so that the attaching portion 90 is attachable to and removable from the adapter main body 22, as shown in FIG. 23, the attaching portion 90 can be fixed to the adapter main body 22 by the same engagement portion 66 as in the fifth embodiment so that the attaching portion 90 is attached to and removable from the adapter main body 22. The hooks 66A, which project toward the adapter main body 22 in the axial direction, are provided on a surface of the base 92 located toward the adapter main body 22. It is preferred that multiple pairs of hooks 66A be provided. Each pair of the hooks 66A is configured to be engaged with one of the projections 36.

Figure 24:
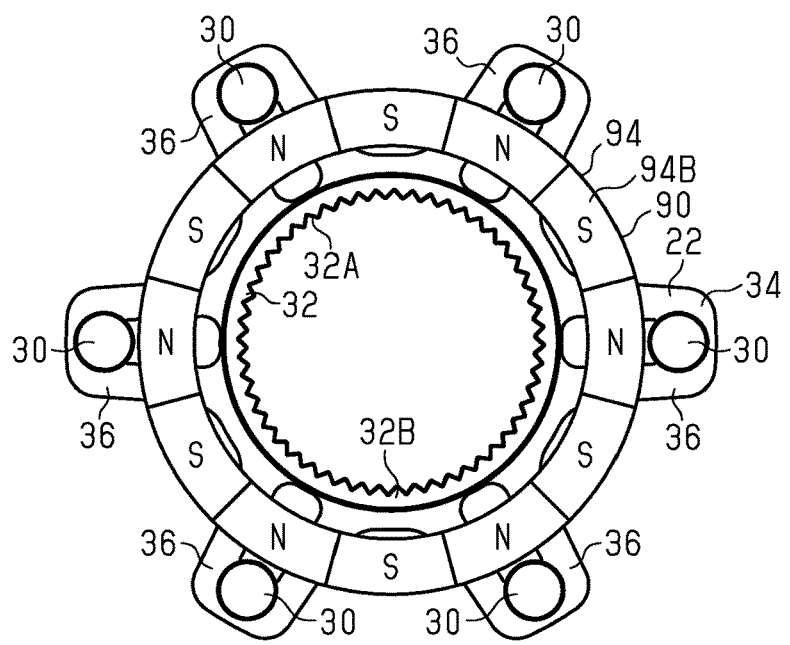
FIG. 24 is a side elevational view of a disc brake adapter in accordance with a fourth modification as viewed in the second direction.

The magnetism generation portion 24 that is shown in FIG. 22 can be changed to a magnetism generation portion 94 that includes an annular permanent magnet 94B in which a plurality of magnetic poles is located next to one another in the circumferential direction as shown in FIG. 24. In this case, the recess 86A of the base 92 is annular. In a case where the base 92 of FIG. 23 includes a magnetic material, the base 92 can be magnetized to form the magnetism generation portion 94.

Figure 25:
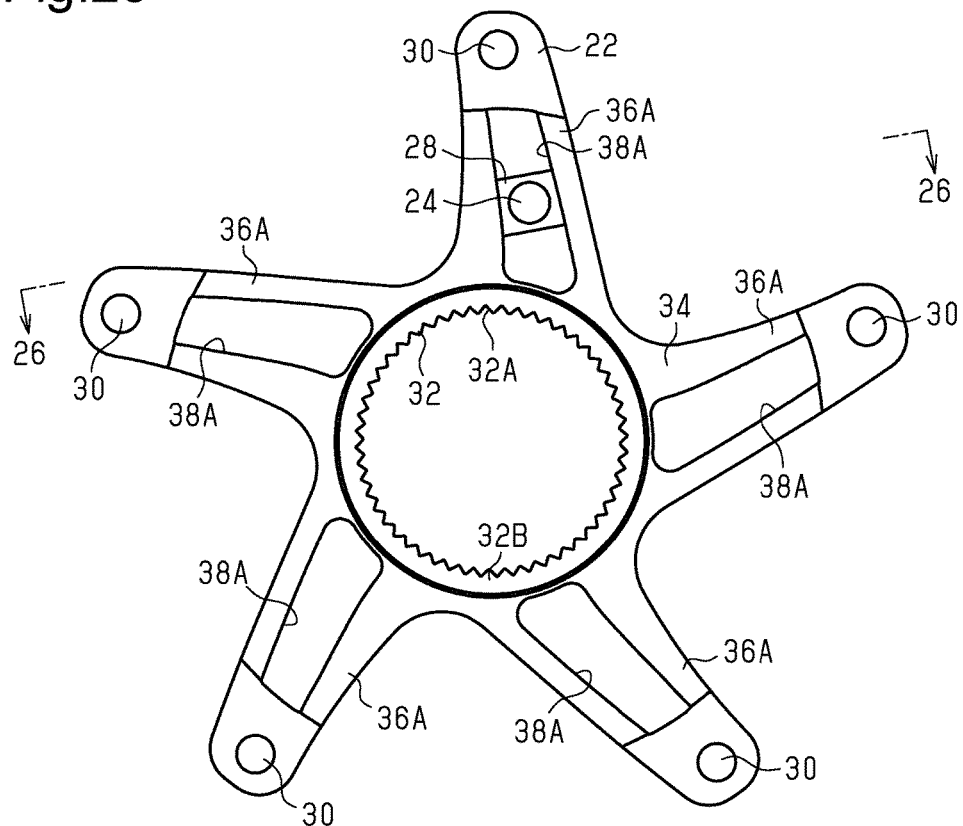
FIG. 25 is a side elevational view of a disc brake adapter in accordance with a fifth modification as viewed in the second direction.
Figure 26:
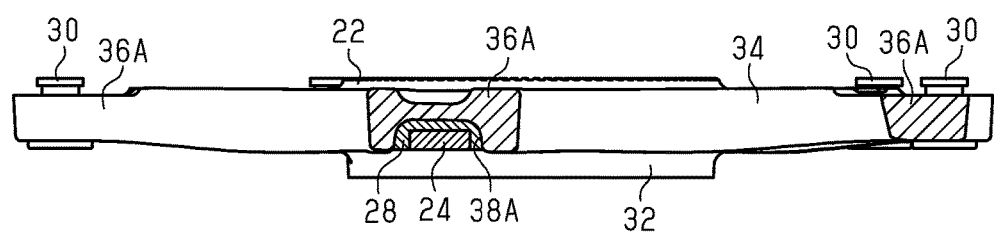
FIG. 26 is a cross-sectional view of a disc brake adapter taken along section line 26-26 in FIG. 25.

As shown in FIGS. 25 and 26, the attaching portion 26 of the adapter main body 22 can be provided on one of the projections 36 instead of being provided between two of the projections 36 that are adjacent to each other in the circumferential direction. The attaching portion 26 is formed integrally with the projection 36.

The thermal insulation portion 28 can be omitted from each of the first and third to eighth embodiments and the modifications.

The adapter main body 22 of each of the embodiments and modifications can include a heat dissipation portion. The heat dissipation portion includes, for example, one or more fins. It is preferred that the heat dissipation portion be provided in the vicinity of the magnetism generation portion 24. The heat dissipation portion is provided, for example, on a surface of the adapter main body 22 opposite to the magnetism generation portion 24 in the axial direction at a position overlapping the magnetism generation portion 24 as viewed in the axial direction.

Figure 27:
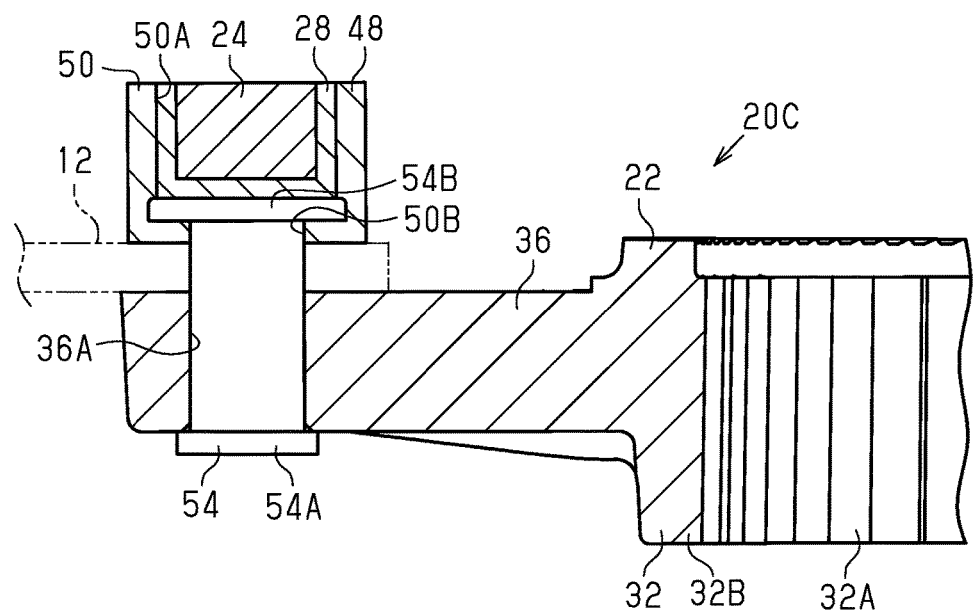
FIG. 27 is an enlarged, partial cross-sectional view of a disc brake rotor in accordance with a sixth modification.

As shown in FIG. 27, in a state where the disc brake rotor 10 is coupled to the hub H, the holder 50 of the third embodiment can be located at a side opposite to the second end H6 of the hub shell H1 of the hub H. In a state where the disc brake rotor 10 is coupled to the hub H, the opening of the recess 50A is formed at the side opposite to the second end H6 of the hub shell H1 of the hub H. The attaching portion 48 is inserted into the first hole 36A and fixed to the projection 36. The joining portion 54 has a second end 54B, which is inserted through the through hole 50B and located in the cavity of the recess 50A. The holder 50 is held between the projection 36 and a portion of the second end 54B located in the cavity of the recess 50A. This supports the holder 50.

Figure 28:
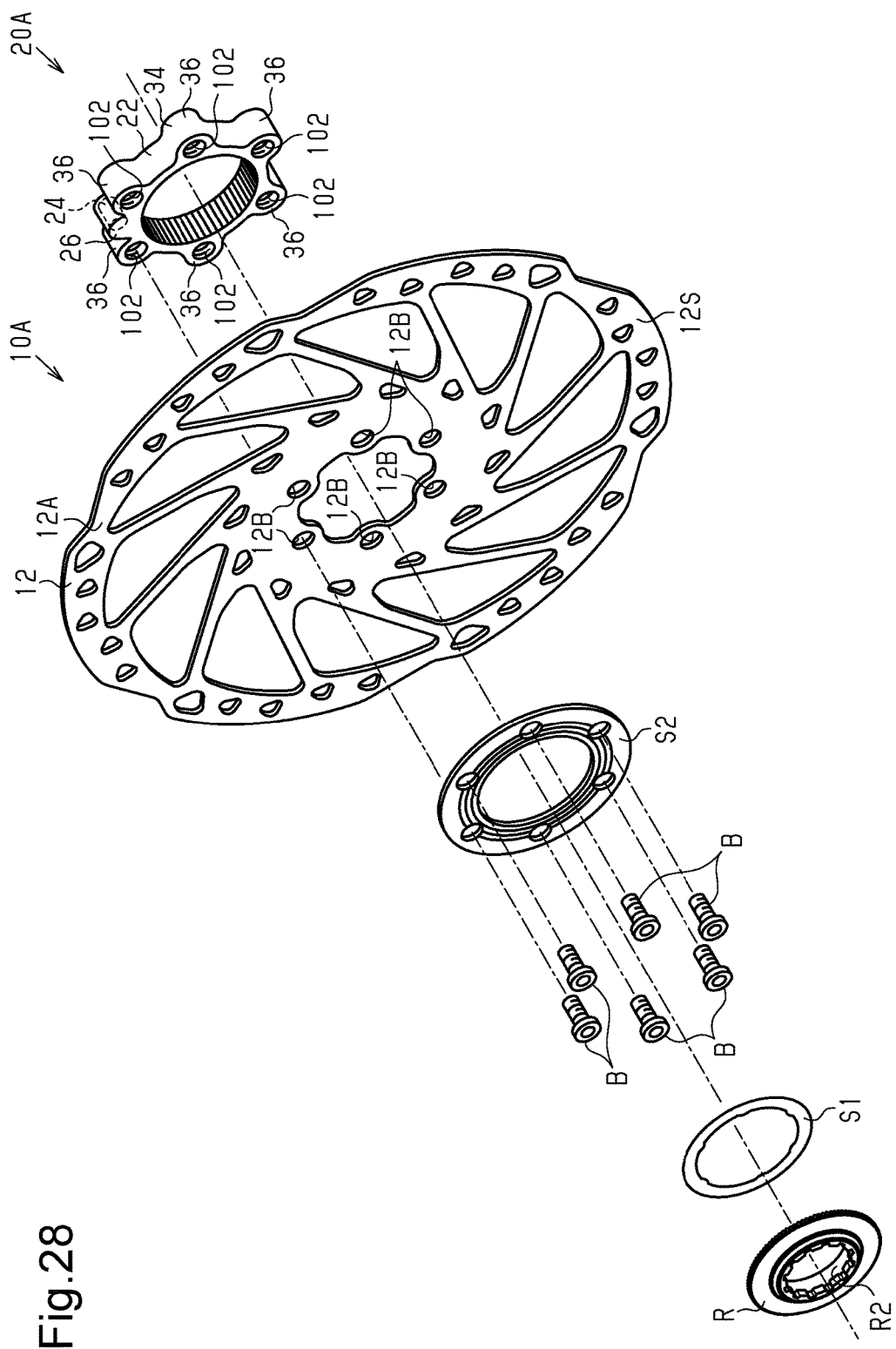
FIG. 28 is an exploded perspective view of a disc brake rotor in accordance with a seventh modification.

As shown in FIG. 28, the disc brake rotor 10 of each of the embodiments and modifications can be changed to a disc brake rotor 10A, which is configured so that the main body 12 is attachable to and removable from the adapters 20A to 20H. The disc brake rotor 10A that is shown in FIG. 28 includes, for example, a plurality of through holes 102 extending through the main body 12. The through holes 102 are located in positions corresponding to the first holes 36A (refer to FIG. 3). A first spacer S1 and a second spacer S2 are located between the fixing member R and the main body 12. The attaching portion 26 is formed integrally with the adapter main body 22. In another example, the attaching portion 26 is formed separately from the adapter main body 22 and coupled to the adapter main body 22 so that the attaching portion 26 is attachable to and removable from the adapter main body 22.

Figure 29:
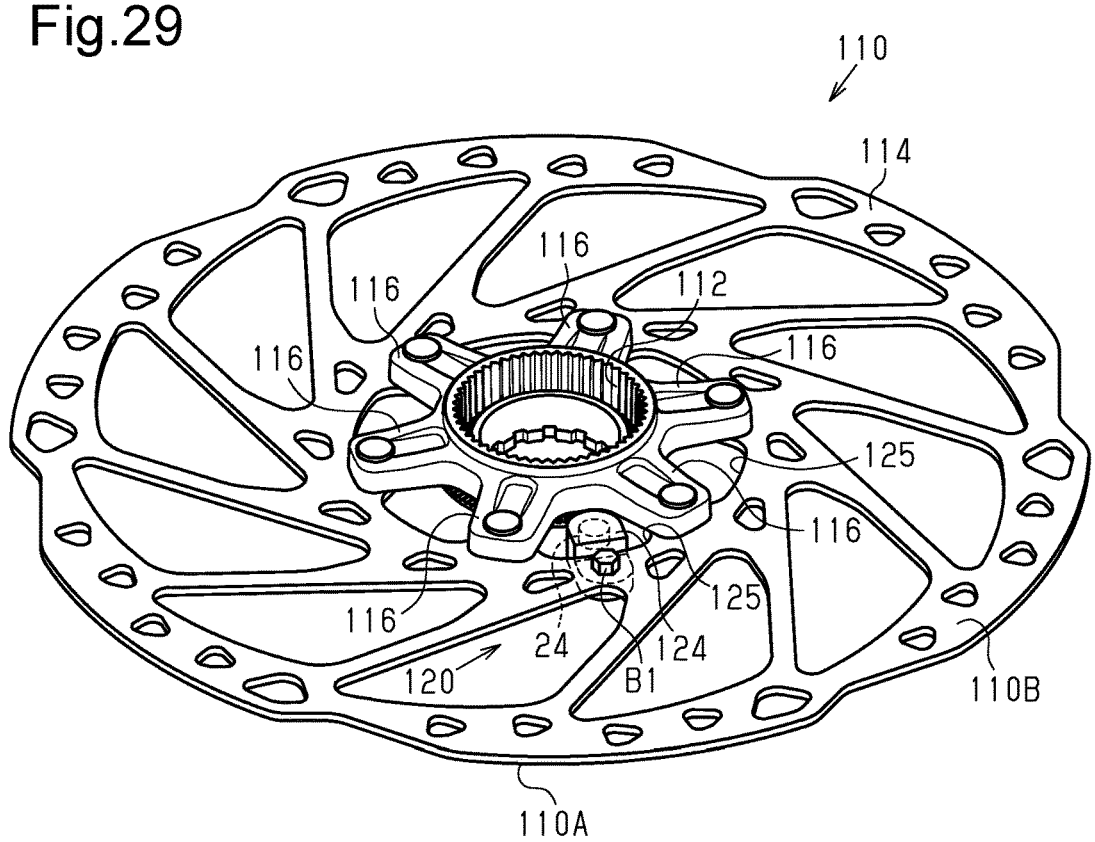
FIG. 29 is a perspective view of a disc brake rotor in accordance with an eighth modification.
Figure 30:
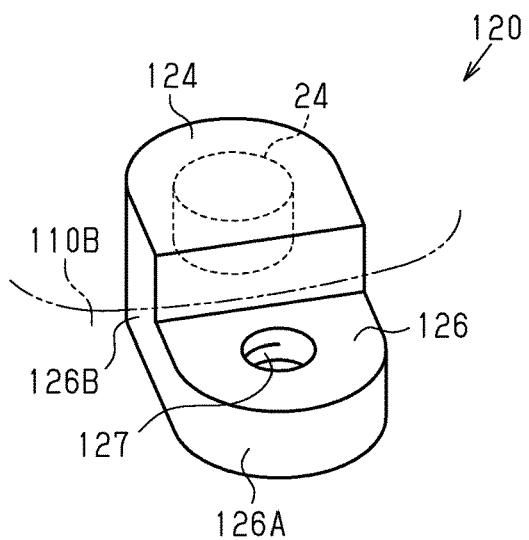
FIG. 30 is a perspective view of an attaching portion of the disc brake rotor shown in FIG. 29.

The attaching portion 42 of the second embodiment can be modified so that the attaching portion 42 is provided on a first side surface 110A of a disc brake rotor 110. For example, the disc brake rotor 110 that is shown in FIG. 29 includes a hub connector 112, a main body 114, and arms 116. The hub connector 112 is configured to be coupled to the hub H (refer to FIG. 2) of the bicycle. The arms 116 connect the hub connector 112 and the main body 114. The disc brake rotor 110 includes a plurality of arms 116. The combination of the hub connector 112 and the arms 116 has the same structure as the adapters 20A to 20H of the above embodiments. The hub connector 112 corresponds to the inner portion 32 of the adapters 20A to 20H of the above embodiments. The arms 116 correspond to the projections 36 of the outer portion 34 of the above embodiments. The main body 114 is located at a radially outer side of the hub connector 112. The disc brake rotor 110 includes the first side surface 110A and a second side surface 110B. In a state where the disc brake rotor 110 is coupled to the hub H, the second side surface 110B is located closer to the second end H6 of the hub shell H1 of the hub H. The first side surface 110A is opposite to the second side surface 110B in the axial direction. The main body 114 has the same structure as the main body 12 of the disc brake rotor 10 of the above embodiments. In this modified example, the hub connector 112 can be formed integrally with the arms 116. Alternatively, the hub connector 112 can be formed separately from the arms 116. Additionally, the arms 116 can be formed integrally with the main body 114. Alternatively, the arms 116 can be formed separately from the main body 114. As shown in FIG. 30, a magnetism generation device 120 is attachable to the disc brake rotor 110. The magnetism generation device 120 includes the magnetism generation portion 24, a holder 124, and a third coupling portion 126. The holder 124 holds the magnetism generation portion 24. The magnetism generation portion 24 is embedded in the holder 124. The third coupling portion 126 is formed integrally with the holder 124 and attachable to the first side surface 110A of the disc brake rotor 110 in the axial direction. The holder 124 is formed from a low permeability material and includes, for example, a resin. The third coupling portion 126 is attached to the first side surface 110A, for example, by a bolt or an adhesive. The third coupling portion 126 is attached to the main body 114 of the disc brake rotor 110.

The holder 124 is configured so that at least a portion of the magnetism generation portion 24 projects from the first side surface 110A into a cavity 125 defined by adjacent ones of the arms 116 of the disc brake rotor 110 in a state where the third coupling portion 126 is attached to the first side surface 110A. The third coupling portion 126 includes a first part 126A and a second part 126B. The first part 126A includes a hole 127, which is internally threaded. The holder 124 is provided on an axial end of the second part 126B. The holder 124 projects from the third coupling portion 126 in the axial direction. In the example shown in FIG. 29, in a state where the third coupling portion 126 is attached to the disc brake rotor 110, the first part 126A is located at a radially outer part of the third coupling portion 126, and the second part 126B is located at a radially inner part of the third coupling portion 126.

The third coupling portion 126 of FIG. 30 can be attached to the first side surface 110A on the adapter main body 22. For example, the hole 127 extends through the third coupling portion 126 in the axial direction. A bolt B1 is inserted through the hole 127 and fastened to a threaded hole formed in the adapter main body 22. This fixes the holder 124 to the disc brake rotor 110.

Figure 31:
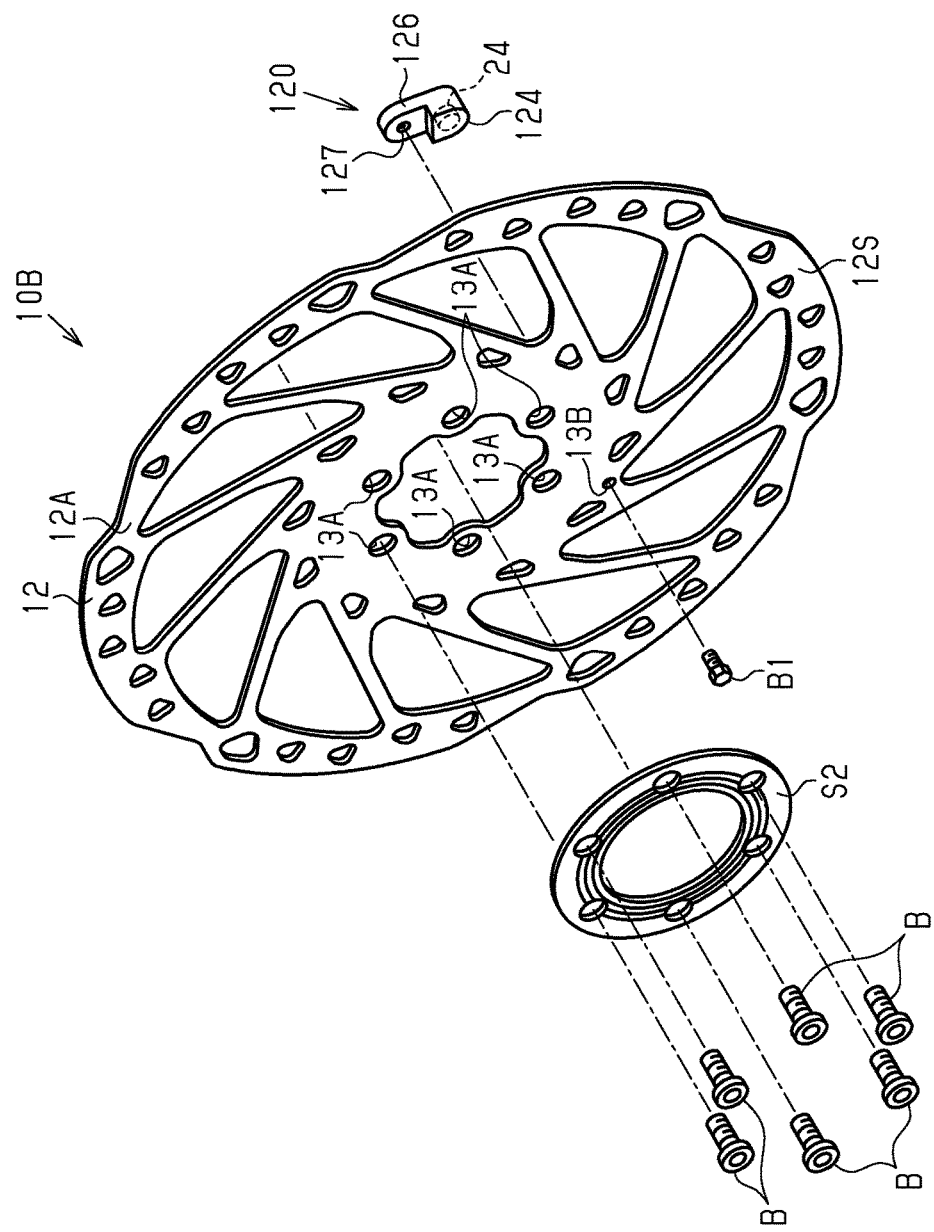
FIG. 31 is an exploded perspective view of a disc brake rotor in accordance with a ninth modification.

The attaching portion 42 of the second embodiment or the holder 124 of FIG. 29 can be attached to a disc brake rotor 10B that is shown in FIG. 31. The disc brake rotor 10B includes a plurality of first coupling portions 13A, a second coupling portion 13B, the magnetism generation portion 24, and the holder 124. The first coupling portions 13A are attachable to the hub H of the bicycle by bolts B. The first coupling portions 13A extend through in the axial direction. The projection H5 (refer to FIG. 2) of the hub H includes internal threads, to which the external threads of the bolts B are fastened. Each of the first coupling portions 13A includes a through hole. The first coupling portions 13A are located on the disc brake rotor 10A at positions corresponding to the internal threads formed in the projection H5 of the hub H. The second coupling portion 13B and the first coupling portions 13A are provided at different positions. A through hole extends through the second coupling portion 13B in the axial direction. The holder 124 couples the magnetism generation portion 24 to the second coupling portion 13B so that the magnetism generation portion 24 is attachable to and removable from the second coupling portion 13B. The holder 124 corresponds to an attaching portion. The second spacer S2 is located between the disc brake rotor 10A and the heads of the bolts B. The bolt B1 is extended through the second coupling portion 13B and fastened to the internal threads of the third coupling portion 126 of the holder 124. This couples the holder 124 to the disc brake rotor 10B so that the holder 124 is attachable to and removable from the disc brake rotor 10B. In the example shown in FIG. 31, in a state where the third coupling portion 126 is attached to the disc brake rotor 110, the first part 126A is located at a radially outer part of the third coupling portion 126, and the second part 126B is located at a radially inner part of the third coupling portion 126.

The magnetism generation portions 24, 94 of the embodiments can include an electromagnet instead of or in addition to the permanent magnet. In this case, the magnetism generation portions 24, 94 can include a coil and a battery that supplies power to the coil. In a case where the magnetism generation portions 24, 94 include an electromagnet, a dynamo can be provided on the hub H so that power is supplied from the dynamo.

The recesses 38A, 44A, 50A, 58A, 64A, 86A can be omitted from the first to fifth embodiments and the modifications. The magnetism generation portion 24 and the thermal insulation portion 28 can be provided on a surface of each of the holders 38, 44, 50, 58, 64, 86.

In each of the embodiments and modifications, the magnetism generation portions 24, 94 can be embedded in the holders 38, 44, 50, 58, 64, 72, 86. In this case, the holders 38, 44, 50, 58, 64, 72, 86 are formed, for example, from a resin material. The magnetism generation portions 24, 94 are formed integrally with the holders 38, 44, 50, 58, 64, 72, 86.

In each of the embodiments and modifications, in a state where the magnetism generation portion 24 is accommodated in the recesses 38A, 44A, 50A, 58A, 64A, 76A, 86A, the magnetism generation portion 24 can be covered by a cover member so as not to be exposed from the openings of the recesses 38A, 44A, 50A, 58A, 64A, 76A, 86A. The cover member is formed from a low permeability material and includes, for example, a resin or an aluminum alloy. The cover member can be fixed to at least one of the adapter main body 22 and the magnetism generation portion 24 through adhesion, fusing, or welding or by a screw.

In each of the embodiments and modifications, the attaching portions 26, 42, 48, 56, 62, 70, 84, 90 can be located between the adapter main body 22 and the main bodies 12 of the disc brake rotors 10, 10A, between the hub connector 112 of the disc brake rotor 110 and the hub H, or between the adapter main body 22 and the first end H4 of the hub H. In this case, a groove or a step is formed on a surface of the adapter main body 22 located closer the hub H. The attaching portions 26, 42, 48, 56, 62, 70, 84, 90 are engaged with the groove or the step to attach the magnetism generation portions 24, 94 to the adapter main bodies 22.

What is claimed is:

1. A disc brake rotor adapter configured to attach a disc brake rotor main body to a bicycle hub having a first spline, the disc brake rotor adapter comprising:
   an adapter main body including an inner portion having a second spline configured to be engaged with the first spline of the hub, and an outer portion configured to be coupled to the disc brake rotor main body;
   a magnetism generation portion; and
   an attaching portion attaching the magnetism generation portion to the adapter main body in a manner irrelevant to a fixing function of a fixing member that is configured to fix the adapter to the hub.

2. The disc brake rotor adapter according to claim 1, wherein
   the attaching portion is configured to be attachable to and removable from the adapter main body.

3. The disc brake rotor adapter according to claim 1, wherein
   the attaching portion includes
   a holder holding the magnetism generation portion, and
   an engagement portion engaging the adapter main body.

4. The disc brake rotor adapter according to claim 3, wherein
   the engagement portion includes a first threaded part.

5. The disc brake rotor adapter according to claim 4, wherein
   the adapter main body includes a second threaded part that engages the first threaded part.

6. The disc brake rotor adapter according to claim 4, wherein
   the engagement portion is formed separately from the holder, and
   the holder includes a first through hole through which the engagement portion extends, and a third threaded part engaged with the first threaded part in a state where the engagement portion extends through the first through hole.

7. The disc brake rotor adapter according to claim 4, wherein
   the engagement portion is formed separately from the holder, the adapter main body includes a second through hole through which the engagement portion extends, and
the holder includes a fourth threaded part engaged with the first threaded part in a state where the engagement portion extends through the second through hole.

8. The disc brake rotor adapter according to claim 1, wherein
the attaching portion is formed integrally with the adapter main body.

9. The disc brake rotor adapter according to claim 1, wherein
the outer portion includes a plurality of projections projecting radially outward, and
the disc brake rotor main body is coupled to the plurality of projections.

10. The disc brake rotor adapter according to claim 9, wherein
the magnetism generation portion is provided between two adjacent ones of the projections.

11. The disc brake rotor adapter according to claim 9, wherein
the magnetism generation portion is provided on one of the projections.

12. The disc brake rotor adapter according to claim 1, wherein
the outer portion includes a plurality of projections projecting radially outward,
the disc brake rotor main body is coupled to the plurality of projections,
each of the projections includes a first hole used for attachment of the disc brake rotor main body, and
the attaching portion is inserted into one of the first holes and fixed to the corresponding projection.

13. The disc brake rotor adapter according to claim 12, wherein
the disc brake rotor main body includes a second hole, and
the attaching portion includes a joining portion that is inserted into one of the first holes and the second hole to join the corresponding projection and the disc brake rotor main body.

14. The disc brake rotor adapter according to claim 1, wherein
the magnetism generation portion includes at least one permanent magnet.

15. The disc brake rotor adapter according to claim 1, wherein
the magnetism generation portion includes an annular permanent magnet, and
the annular permanent magnet includes a plurality of magnetic poles located next to one another in a circumferential direction.

16. The disc brake rotor adapter according to claim 1, wherein
the attaching portion includes an annular base, and
the magnetism generation portion includes a plurality of permanent magnets spaced apart from one another in a circumferential direction of the base.

17. The disc brake rotor adapter according to claim 1, further comprising
a thermal insulation portion located between the magnetism generation portion and the attaching portion, the thermal insulation portion limiting heat transfer between the magnetism generation portion and the attaching portion.

18. The disc brake rotor adapter according to claim 1, wherein
the adapter main body includes one of steel and an aluminum alloy.

19. A disc brake rotor comprising the disc brake rotor adapter according to claim 1, and further comprising
the disc brake rotor main body coupled to the adapter.

20. A disc brake rotor comprising:
a plurality of first coupling portions attachable to a hub of a bicycle with bolts;
a second coupling portion provided at a position that differs from positions of the first coupling portions;
a magnetism generation portion; and
an attaching portion that couples the magnetism generation portion to the second coupling portion so that the magnetism generation portion is attachable to and removable from the second coupling portion.

21. A magnetism generation device attachable to a disc brake rotor including a hub connector configured to be coupled to a bicycle hub, a main body located at a radially outer side of the hub connector, and a plurality of arms extending radially and connecting the hub connector and the main body, the magnetism generation device comprising:
a magnetism generation portion;
a holder holding the magnetism generation portion; and
a third coupling portion formed integrally with the holder, the third coupling portion being attachable to a first side surface of the disc brake rotor in an axial direction,
the holder being configured so that in a state where the third coupling portion is attached to the first side surface, the magnetism generation portion at least partially projecting from the first side surface into a cavity defined between adjacent ones of the arms in a circumferential direction of the disc brake rotor.

22. The magnetism generation device according to claim 21, wherein
the magnetism generation portion is embedded in the holder.

23. A magnetism generation device attached to an adapter main body including an inner portion having a spline configured to be engaged with a spline provided on a bicycle hub, and an outer portion configured to be coupled to a disc brake rotor main body, the outer portion including a projection projecting radially outward, the magnetism generation device comprising:
a magnetism generation portion; and
an attaching portion attaching the magnetism generation portion to the adapter main body in a manner irrelevant to a fixing function of a fixing member, the fixing member being configured to fix the adapter main body to the hub,
the attaching portion including a holder holding the magnetism generation portion, and a plurality of engagement portions,
the holder including a first portion and a second portion that is located at opposite sides of the projection, and
the plurality of engagement portions being coupled to the first portion and the second portion.

24. The magnetism generation device according to claim 23, wherein
each of the plurality of engagement portions is formed by a bolt.

25. The magnetism generation device according to claim 23, wherein
at least two of the plurality of engagement portions are located at opposite sides of the projection in a circumferential direction.

26. The magnetism generation device according to claim 23, wherein each of the plurality of engagement portions includes a first threaded part,
the first portion includes a first through hole through which the engagement portion extends, and
the second portion includes a third threaded part engaged with the first threaded part.

27. The magnetism generation device according to claim 23, wherein
the magnetism generation portion is located on the first portion.

28. The magnetism generation device according to claim 27, wherein
the first portion includes a recess, and
the magnetism generation portion is accommodated in the recess.

29. The magnetism generation device according to claim 28, wherein
the entire magnetism generation portion is accommodated in the recess.

30. The magnetism generation device according to claim 23, wherein
the first portion is formed from one of an aluminum alloy and a resin.

31. A disc brake rotor adapter comprising the magnetism generation device according to claim 23, and further comprising
the adapter main body.

* * * * *